May 13, 1958 H. O. IRMSCHER 2,834,164

MANUFACTURE OF FILLED PACKAGES WITH STRING-HANDLES IN PREDETERMINED COUNTED OUTPUT GROUPS

Filed Aug. 28, 1952 23 Sheets-Sheet 1

INVENTOR.
HANS O. IRMSCHER

BY

Louis Barnett
ATTORNEY

INVENTOR.
HANS O. IRMSCHER
BY
Louis Barnett
ATTORNEY

May 13, 1958 H. O. IRMSCHER 2,834,164

MANUFACTURE OF FILLED PACKAGES WITH STRING-HANDLES IN PREDETERMINED COUNTED OUTPUT GROUPS

Filed Aug. 28, 1952 23 Sheets-Sheet 3

INVENTOR.
HANS O. IRMSCHER
BY
Louis Barnett
ATTORNEY

INVENTOR.
HANS O. IRMSCHER
BY
Louis Barnett
ATTORNEY

May 13, 1958 H. O. IRMSCHER 2,834,164

MANUFACTURE OF FILLED PACKAGES WITH STRING-HANDLES IN PREDETERMINED COUNTED OUTPUT GROUPS

Filed Aug. 28, 1952 23 Sheets-Sheet 5

INVENTOR.
HANS O. IRMSCHER

BY

Louis Barnett
ATTORNEY

INVENTOR.
HANS O. IRMSCHER
BY
Louis Barnett
ATTORNEY

INVENTOR.
HANS O. IRMSCHER
BY
Louis Barnett
ATTORNEY

INVENTOR.
HANS O. IRMSCHER
BY
Louis Barnett
ATTORNEY

May 13, 1958 H. O. IRMSCHER 2,834,164

MANUFACTURE OF FILLED PACKAGES WITH STRING-HANDLES IN PREDETERMINED COUNTED OUTPUT GROUPS

Filed Aug. 28, 1952 23 Sheets-Sheet 9

INVENTOR.
HANS O. IRMSCHER
BY
Louis Barnett
ATTORNEY

INVENTOR.
HANS O. IRMSCHER
BY
Louis Barnett
ATTORNEY

INVENTOR.
HANS O. IRMSCHER
BY
Louis Barnett
ATTORNEY

INVENTOR.
HANS O. IRMSCHER
BY
Louis Barnett
ATTORNEY

INVENTOR.
HANS O. IRMSCHER
BY
Louis Barnett
ATTORNEY

May 13, 1958 H. O. IRMSCHER 2,834,164

MANUFACTURE OF FILLED PACKAGES WITH STRING-HANDLES IN PREDETERMINED COUNTED OUTPUT GROUPS

Filed Aug. 28, 1952 23 Sheets-Sheet 14

INVENTOR.
HANS O. IRMSCHER
BY
Louis Barnett
ATTORNEY

INVENTOR.
HANS O. IRMSCHER
BY
Louis Barnett
ATTORNEY

INVENTOR.
HANS O. IRMSCHER
BY
Louis Barnett
ATTORNEY

INVENTOR.
HANS O. IRMSCHER
BY
Louis Barnett
ATTORNEY

INVENTOR.
HANS O. IRMSCHER
BY
Louis Barnett,
ATTORNEY

INVENTOR.
HANS O. IRMSCHER
BY
Louis Barnett
ATTORNEY

INVENTOR.
HANS O. IRMSCHER
BY
Louis Barnett
ATTORNEY

May 13, 1958 H. O. IRMSCHER 2,834,164

MANUFACTURE OF FILLED PACKAGES WITH STRING-HANDLES IN PREDETERMINED COUNTED OUTPUT GROUPS

Filed Aug. 28, 1952 23 Sheets-Sheet 21

INVENTOR.
HANS O. IRMSCHER
BY
Louis Barnett
ATTORNEY

INVENTOR.
HANS O. IRMSCHER
BY
Louis Barnett
ATTORNEY

May 13, 1958 H. O. IRMSCHER 2,834,164

MANUFACTURE OF FILLED PACKAGES WITH STRING-HANDLES IN PREDETERMINED COUNTED OUTPUT GROUPS

Filed Aug. 28, 1952 23 Sheets-Sheet 23

INVENTOR.
HANS O. IRMSCHER
BY
Louis Barnett
ATTORNEY

United States Patent Office 2,834,164

Patented May 13, 1958

2,834,164

MANUFACTURE OF FILLED PACKAGES WITH STRING-HANDLES IN PREDETERMINED COUNTED OUTPUT GROUPS

Hans O. Irmscher, Uniondale-Hempstead, N. Y., assignor to National Tea Packing Co., Inc., a corporation of New York Application August 28, 1952, Serial No. 306,764

36 Claims. (Cl. 53—14)

This invention relates to the manufacture of filled packages with string handles and tags.

More particularly the invention is directed to an improved apparatus unit having mechanisms and machine combinations for forming tags to terminate string handles, attaching same to filled packages, supporting each string handle and tag in non-tangling position to the package, and for automatically delivering counted groups directly to containers ready for dispensing to the retail trade, said apparatus mechanisms and machine combinations providing improved super high-speed, fully automatic units capable of performance and output for use in the manufacture of tea-balls, or other essence containing infusion, color-tinting and the like packages, and also to an improved method for complete manufacturing thereof in delivered quantity production in a manner and at a rate of speed higher than heretofore for the like or equivalent manufacture.

Among the objects of the invention is to provide an improved apparatus unit comprising mechanisms and machine combinations and method of the character described, which apparatus unit mechanisms and machine combination shall comprise assembly of parts that are compactly arranged for automatically performing all the various operations necessary to form a tag terminating at one end of each string-handle and attaching the other end of said string handle in an over-edge extending relation to each filled package with the string handle and tag supported in a non-tangling position, and for delivering counted groups of such completely finished filled packages directly to containers all during the improved process of manufacture in quantity production, which shall require minimum attention in operation and maintenance, which shall be relatively inexpensive to construct yet capable of continuously handling larger capacity outputs of productions of filled packages with non-tanglable string handles and tags in counted groups than heretofore for the like or equivalent manufacture, which shall be capable of being incorporated into or operated in conjunction with super high-speed automatic filled package manufacture to provide smooth running, dependable and reliable installation apparatus units, and which shall be practical and efficient to a high degree in use.

Other objects of the invention will in part be obvious and in part hereinafter pointed out.

The invention accordingly consists of features of constructions, combination of elements, arrangements of parts and steps which will be exemplified in the construction and method hereinafter described, and of which the scope of the application will be indicated in the claims following.

The subject matter of this application is a continuation-in-part of features of the invention described and shown in my copending application, Ser. No. 79,034, filed March 1, 1949, for the Manufacture of Packages With String-Handles and Tags.

In the accompanying drawing in which is shown a possible embodiment of the invention—

Fig. 1 is a front elevational view of a complete super high-speed fully automatic apparatus constructed as a unit to incorporate the invention for manufacturing filled packages with string handles, such as for example, as used for brewing tea, coffee, and the like, or for providing tinting solutions, said unit construction employing the improved method of manufacturing in quantity production delivered in predetermined counted groups directly to containers ready for distribution to the retail trade.

Figure 3:
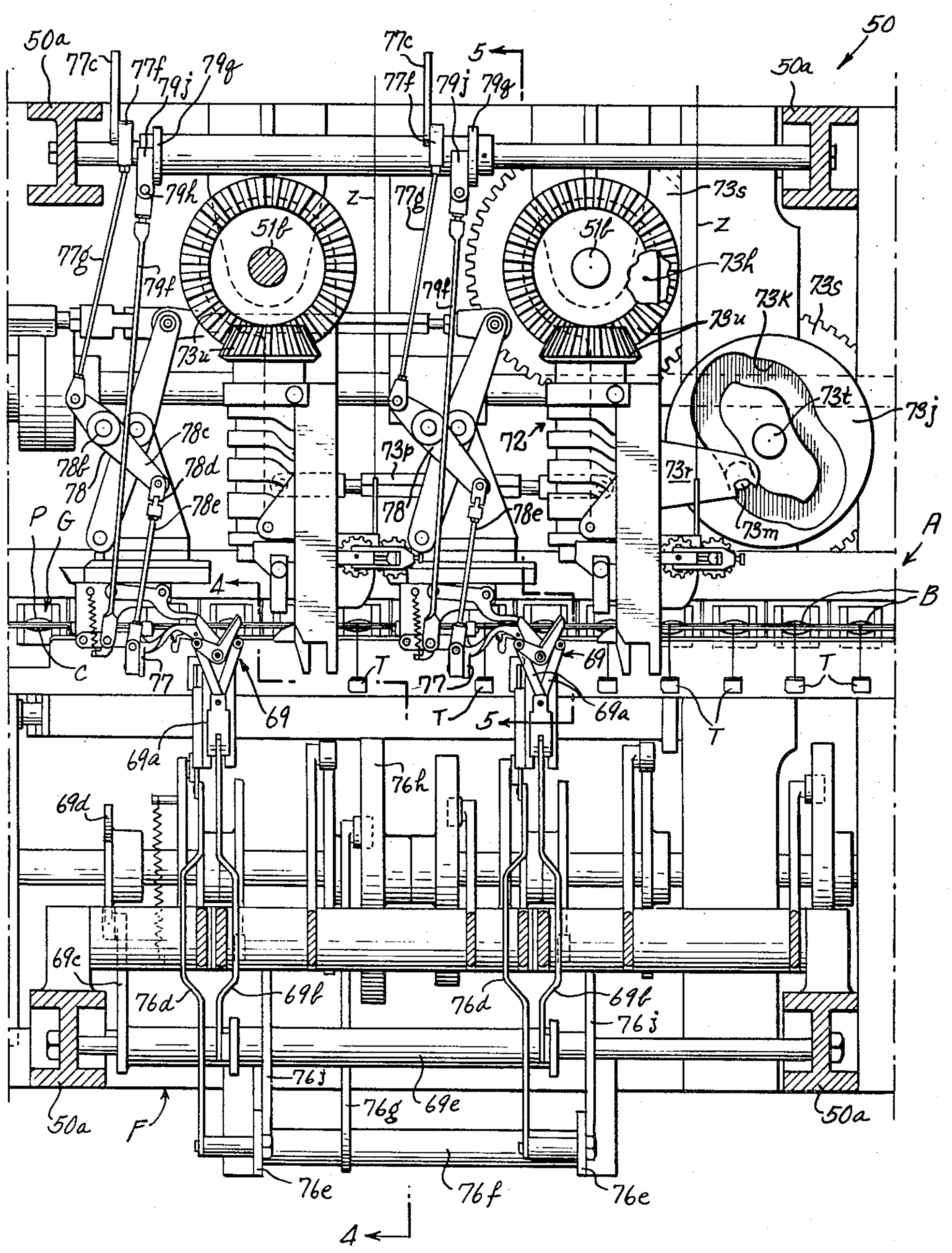
Fig. 3 is a cross-sectional view taken horizontally on lines 3—3 in Fig. 2, showing details of the improved tag making string-handle anchoring means.
Figures 4, 5:
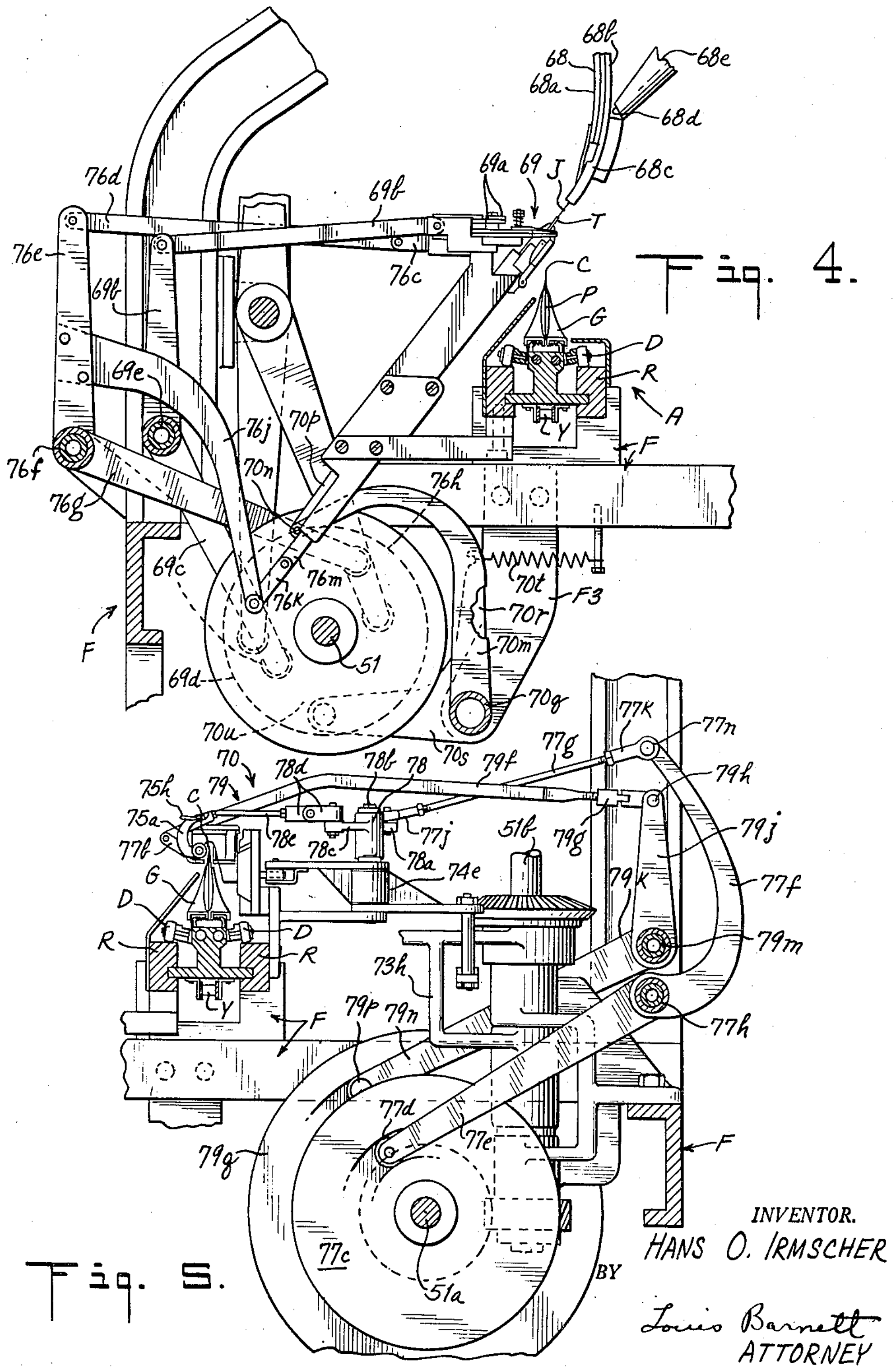

Figs. 4 and 5 are cross-sectional views taken vertically on lines 4—4 and 5—5, respectively, in Fig. 3 showing details of the improved string-handle and tag forming mechanism power-drive transmission.

Figures 6, 7:
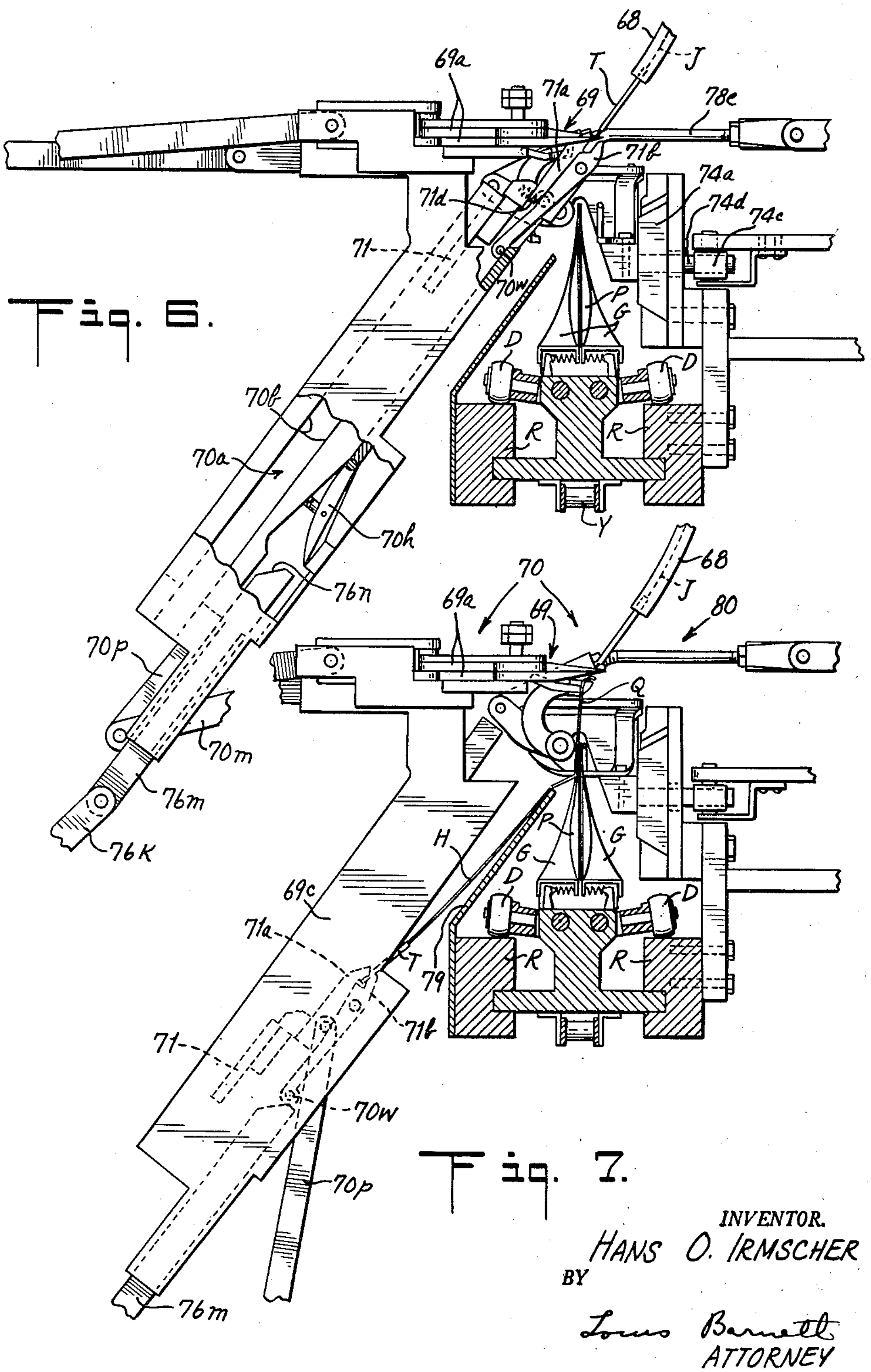

Figs. 6 and 7 are enlarged vertical cross-sectional views showing successively positions of the improved mechanism portions during the attachment operation of the string-handle to the top closure seam of a package in said over-edge extending relation prior to anchor-stapling thereof.

Figures 8, 8A, 9:
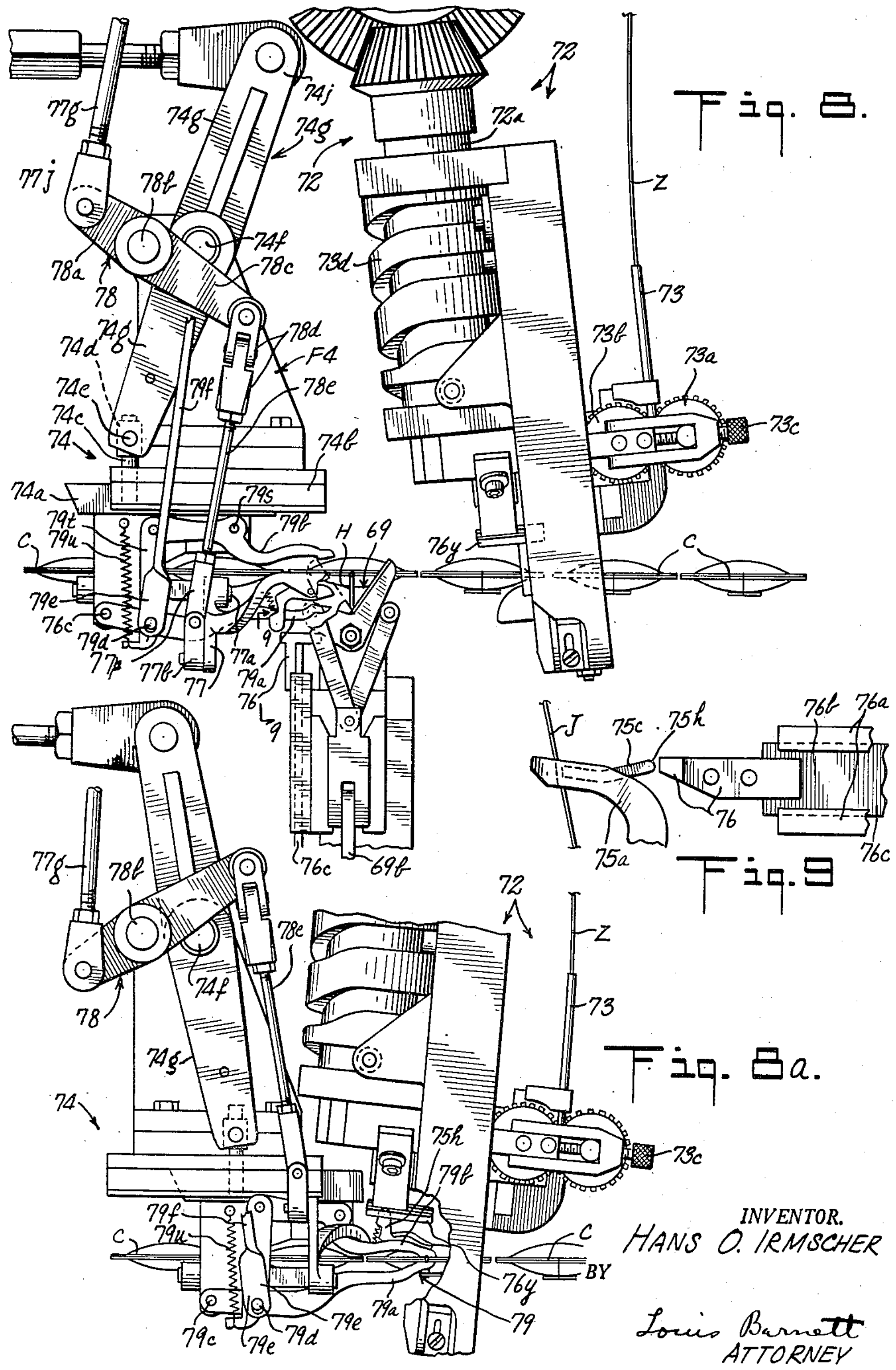

Figs. 8 and 8*a* are enlarged plan views showing successive portions of said string-handle over-edge extending manipulation means in position before and during said stapling of the string-handle to the package top closure seam, respectively.

Fig. 9 is a fragmentary elevational view of an actuator for the string-handle end gripper during the over-edge extending operation as seen from line 9—9 in Fig. 8.

Figure 10:
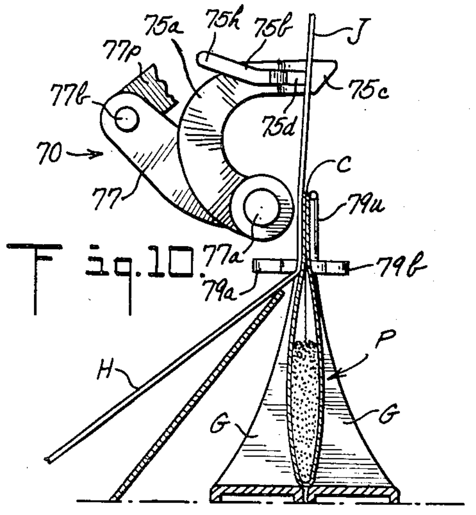
Figure 10A:
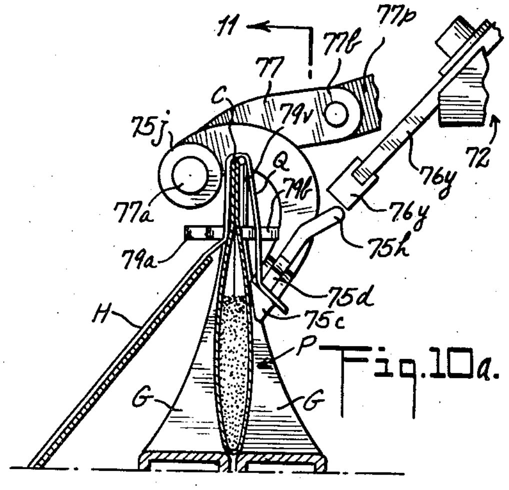
Figure 10B:
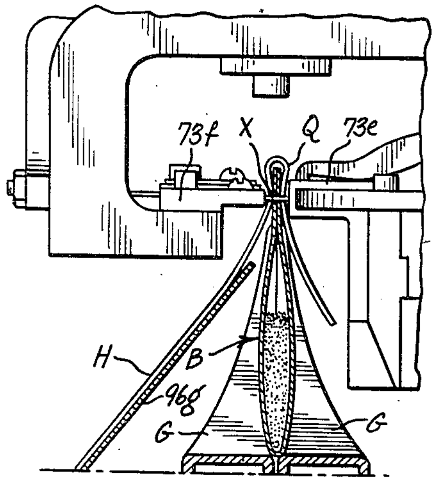

Figs. 10, 10*a*, and 10*b* are enlarged fragmentary elevational views, partly in sections, showing successive steps in applying the string-handle end in the over-edge extension operation thereof prior to and during the anchor-stapling operation.

Figure 11:
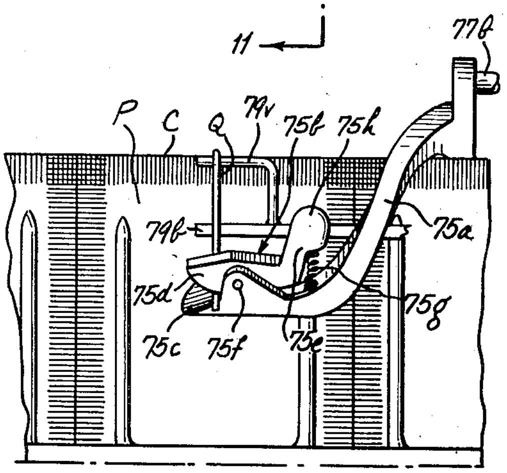

Fig. 11 is a view as seen from line 11—11 in Fig. 10*a* showing said over-edge extension operation with bracing means at the closure seam edge.

Figure 12:
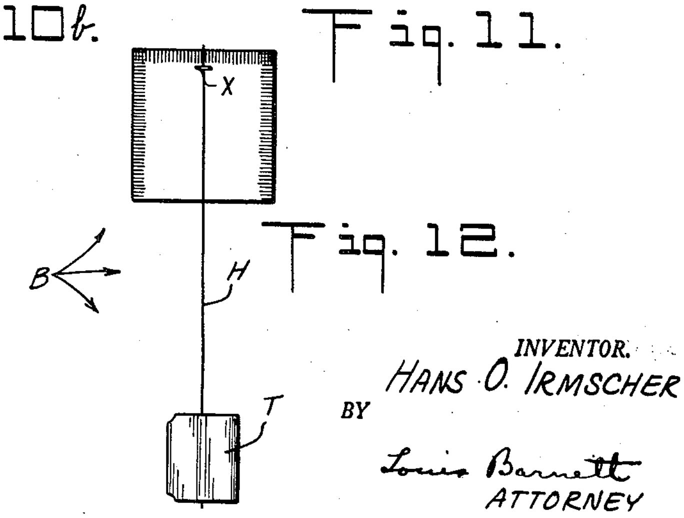

Fig. 12 is a front elevational view of a filled tea-ball showing the anchored end of string-handle stapled in the over-edge extending position removed from the apparatus unit after being operated on as shown in Fig. 10*b* and with the tag terminating the depending free end of the string-handle.

Figure 14:
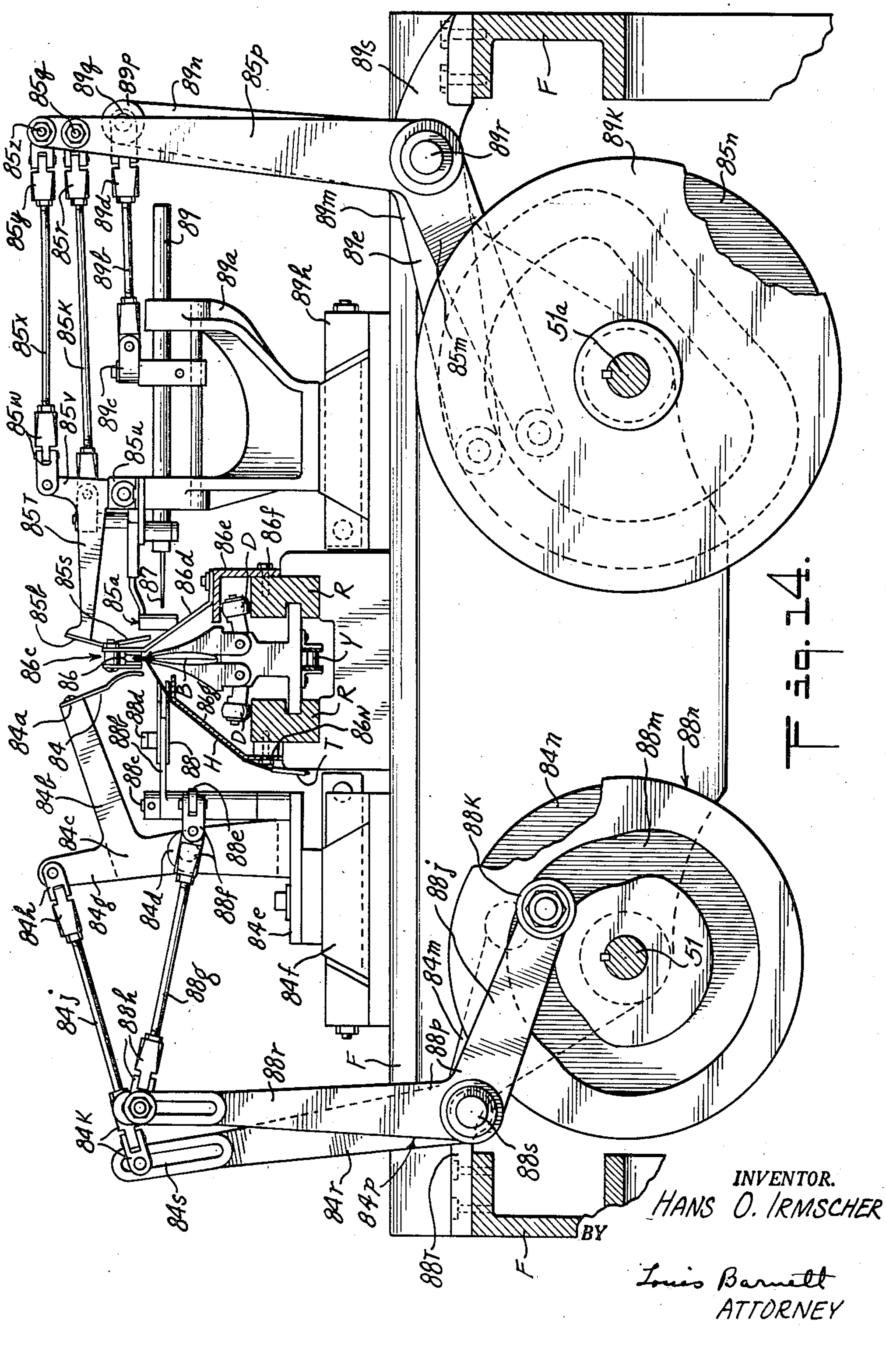

Fig. 14 is a sectional view showing details of the power-transmission drive for operating the string-handle stapling in over-edge extending anchorage shown in Figs. 6 to 12, inclusive.

Figures 15, 16, 16A:
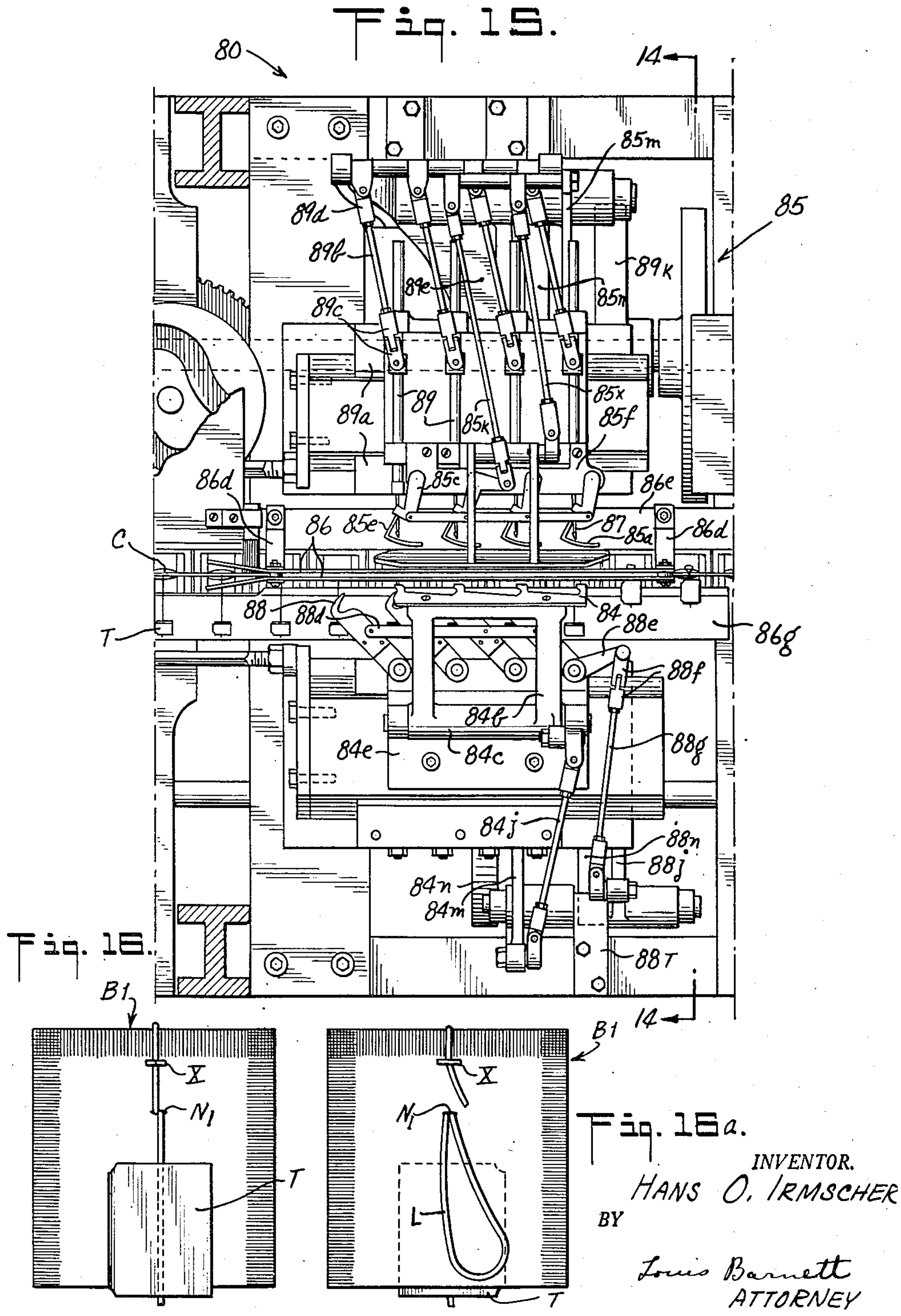

Fig. 15 is a front elevational view of the portion of the improved apparatus unit for loop-shortening each passing string-handle to a non-tangling position.

Figs. 16 and 16*a* are front and rear views, respectively, of a finished tea-ball removed from the apparatus unit after being acted on by the portion thereof shown in Fig. 15.

Figures 17, 18, 19:
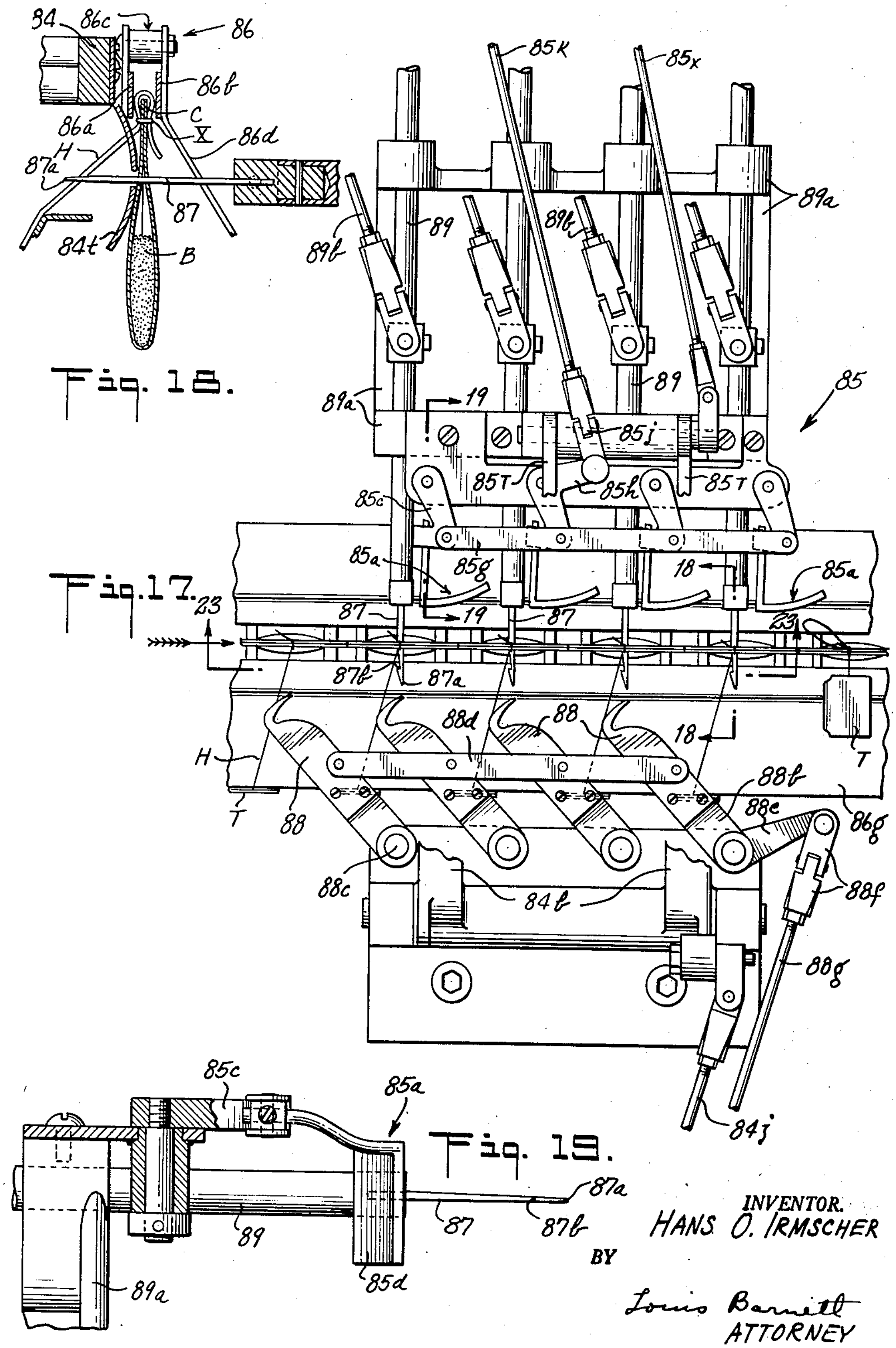

Fig. 17 is an enlarged fragmentary portion of string-handle shortening apparatus unit portion showing the operational details before loop-shortening to a non-tangling position.

Figs. 18 and 19 are cross-sectional views taken on lines 18—18 and 19—19 in Fig. 17, respectively, Fig. 18 showing the piercing needle in position for engaging a mid-portion of the string-handle before loop-shortening same into non-tangling position, and Fig. 19 showing one of the swingable string-looping guides in full and in dotted lines positions to indicate the movement thereof.

Figures 20, 20A, 21, 22:
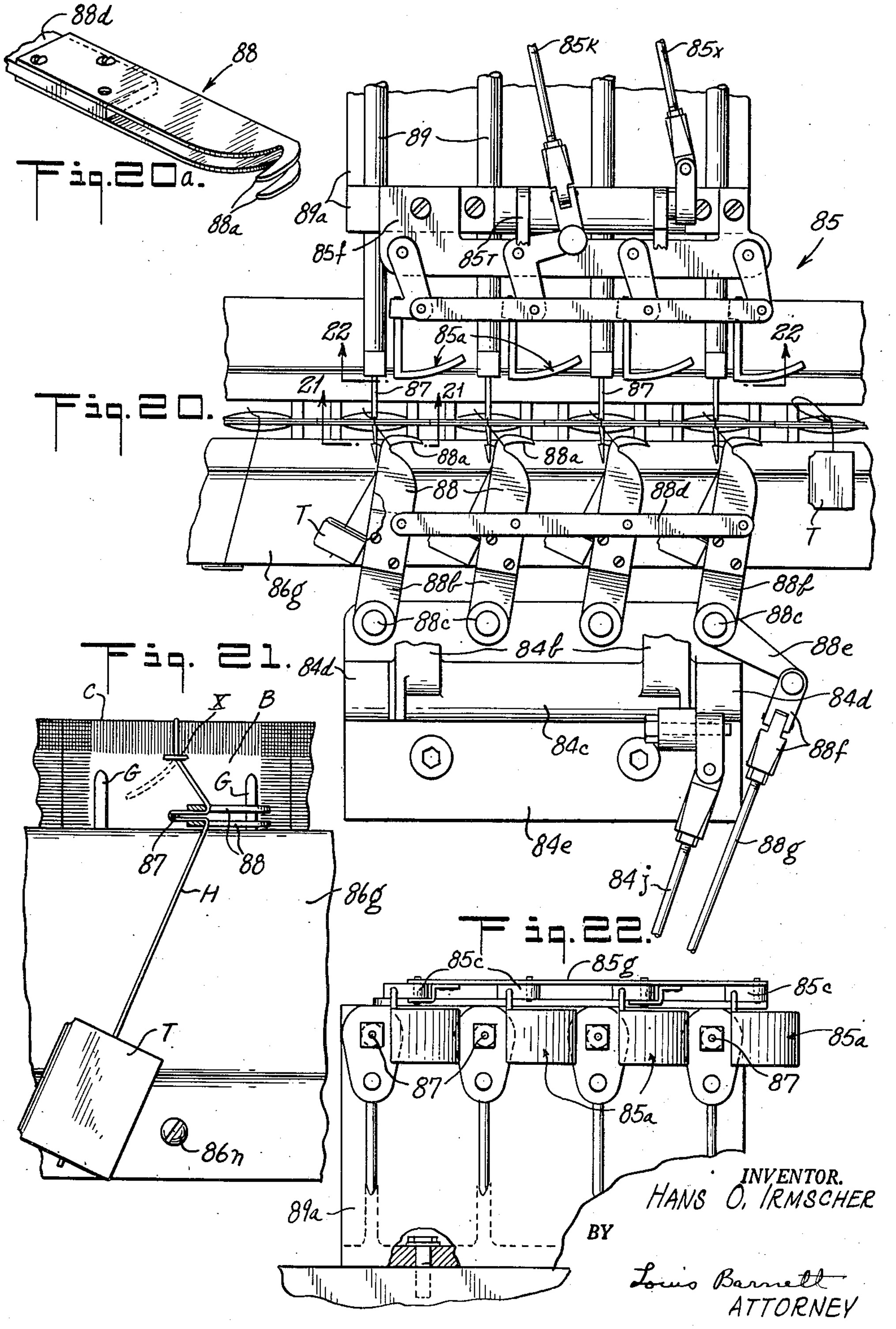

Fig. 20 is an enlarged fragmentary portion of string-handle shortening apparatus unit portion like that shown in Fig. 17 but having the operational parts positioned during said loop-shortening operation.

Fig. 20*a* is a perspective view of one of the hook end string-handle engaging means serving to operate for loop-shortening as shown in Fig. 20.

Figs. 21 and 22 are enlarged cross-sectional views taken on lines 21—21 and 22—22 in Fig. 20, respectively, showing the construction in greater detail.

Figure 23:
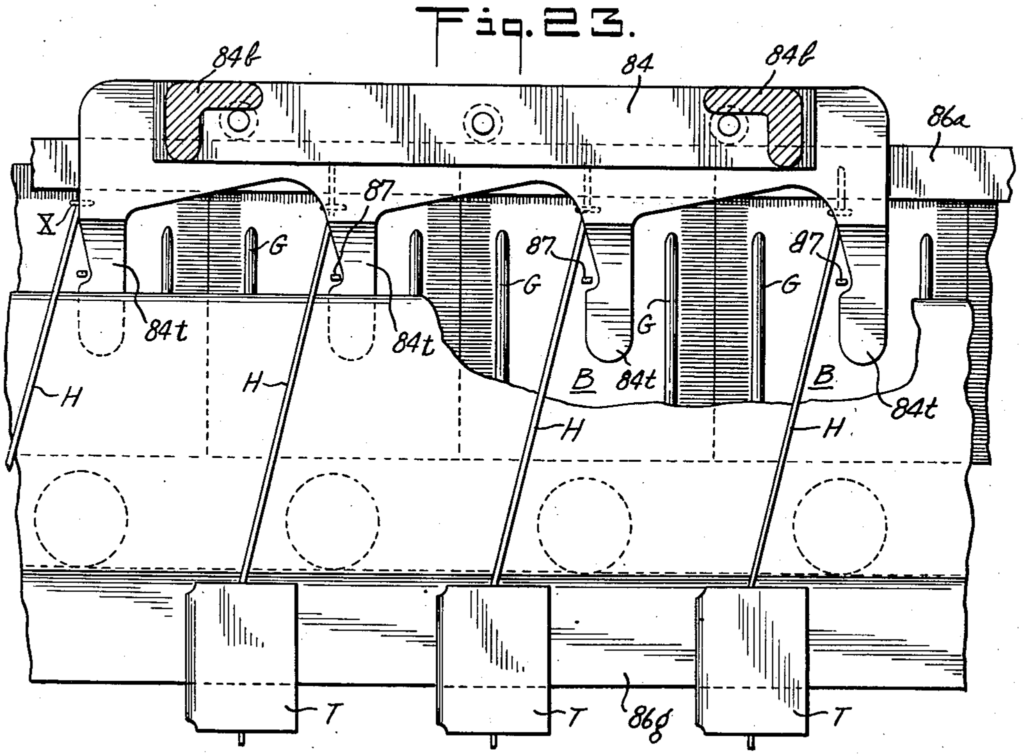

Fig. 23 is an enlarged view showing the travelling position of the string-handles prior to being shortened as taken on lines 23—23 in Fig. 17.

Figures 24, 25:
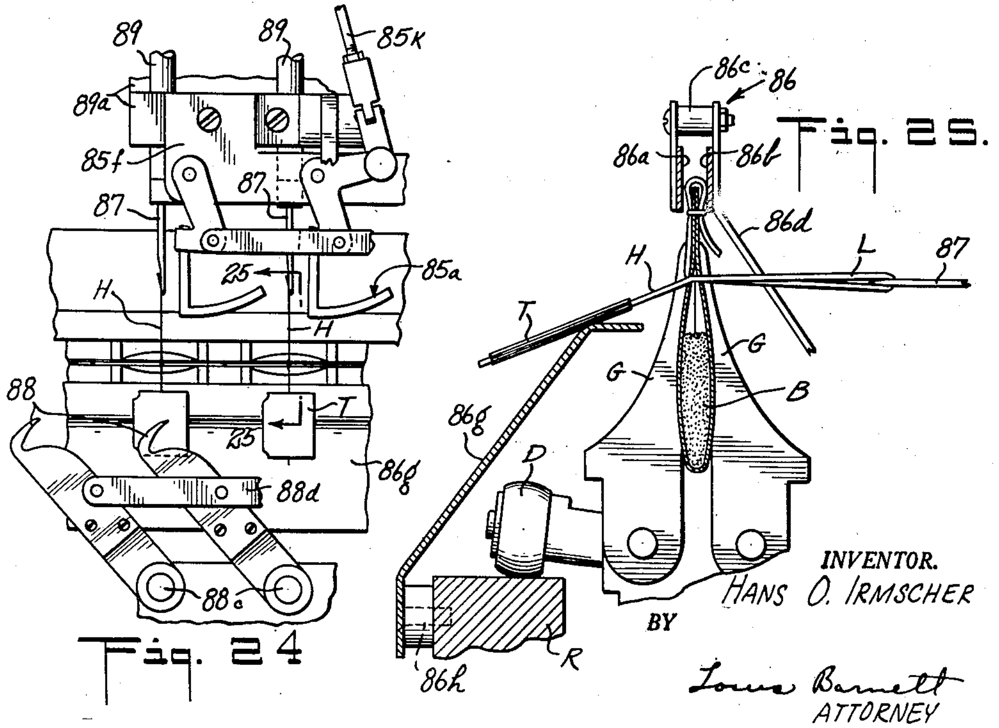

Fig. 24 is a fragmentary view of part of that shown in Fig. 17 but showing the needles in retracted position after pulling the loop of the string-handle through the package in said shortening operation.

Fig. 25 is a cross-sectional view taken on lines 25—25 in Fig. 24 showing the loop shortening operation almost completed.

Figure 26:
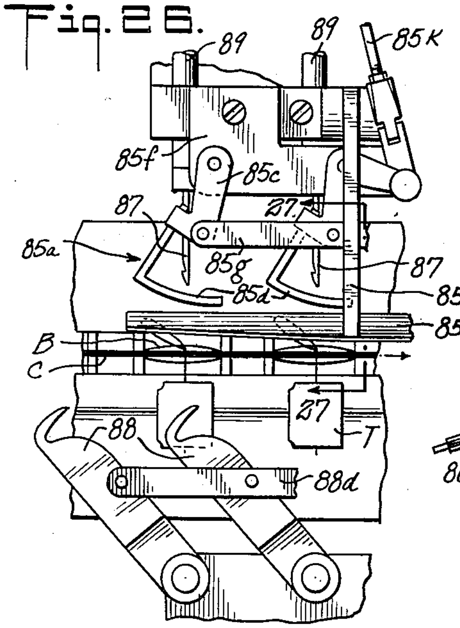

Fig. 26 is a fragmentary view similar to Fig. 24 but showing the loop-shortening operation completed and the string-handle released from the needle engagement.

Figure 27:
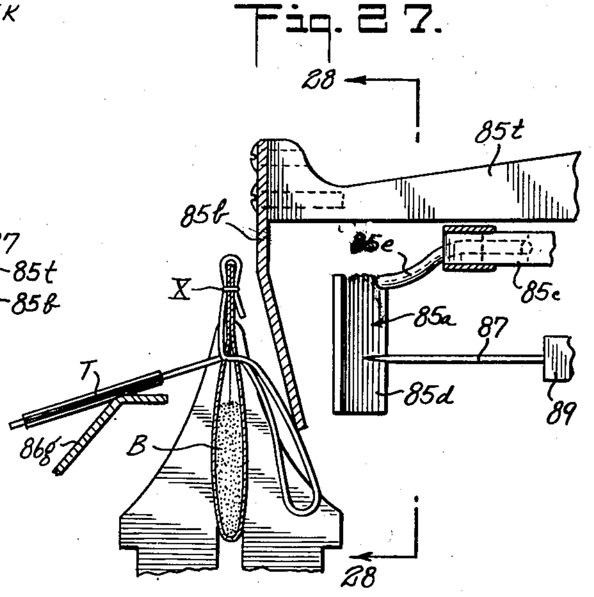
Figure 28:
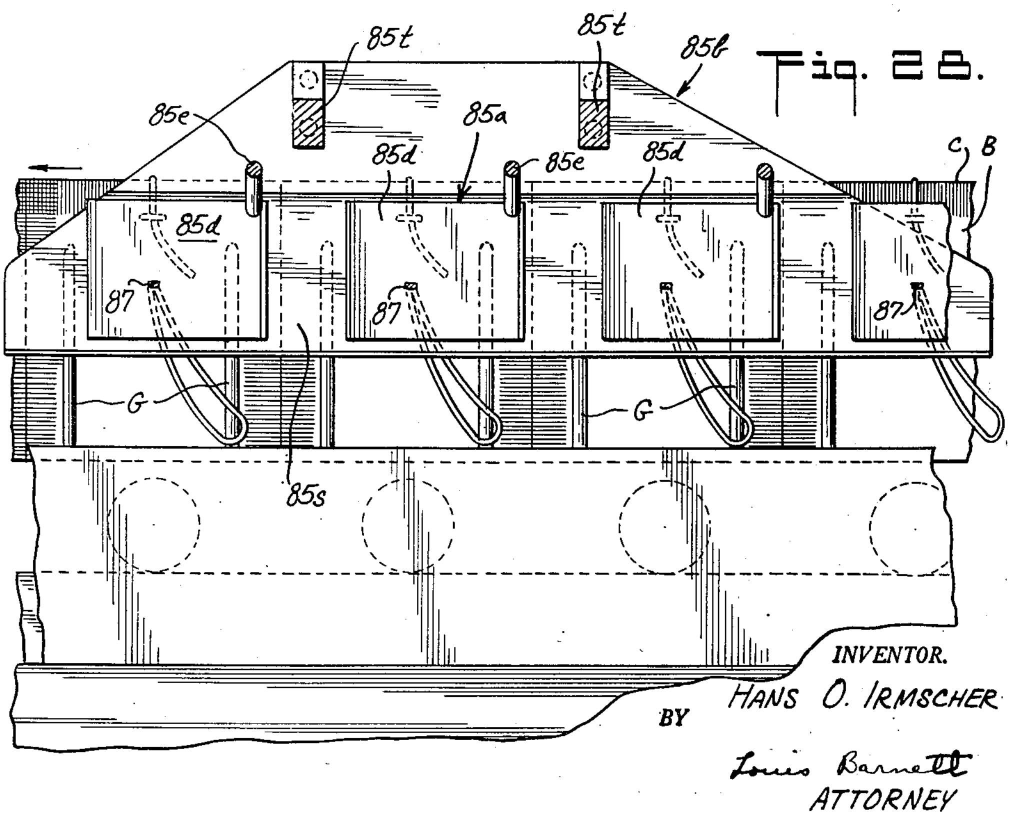

Figs. 27 and 28 are enlarged in detail cross-sectional views taken on line 27—27 in Fig. 26 and on line 28—28 in Fig. 27, respectively, showing details of the string-handle loop shortening operation.

Figure 1:
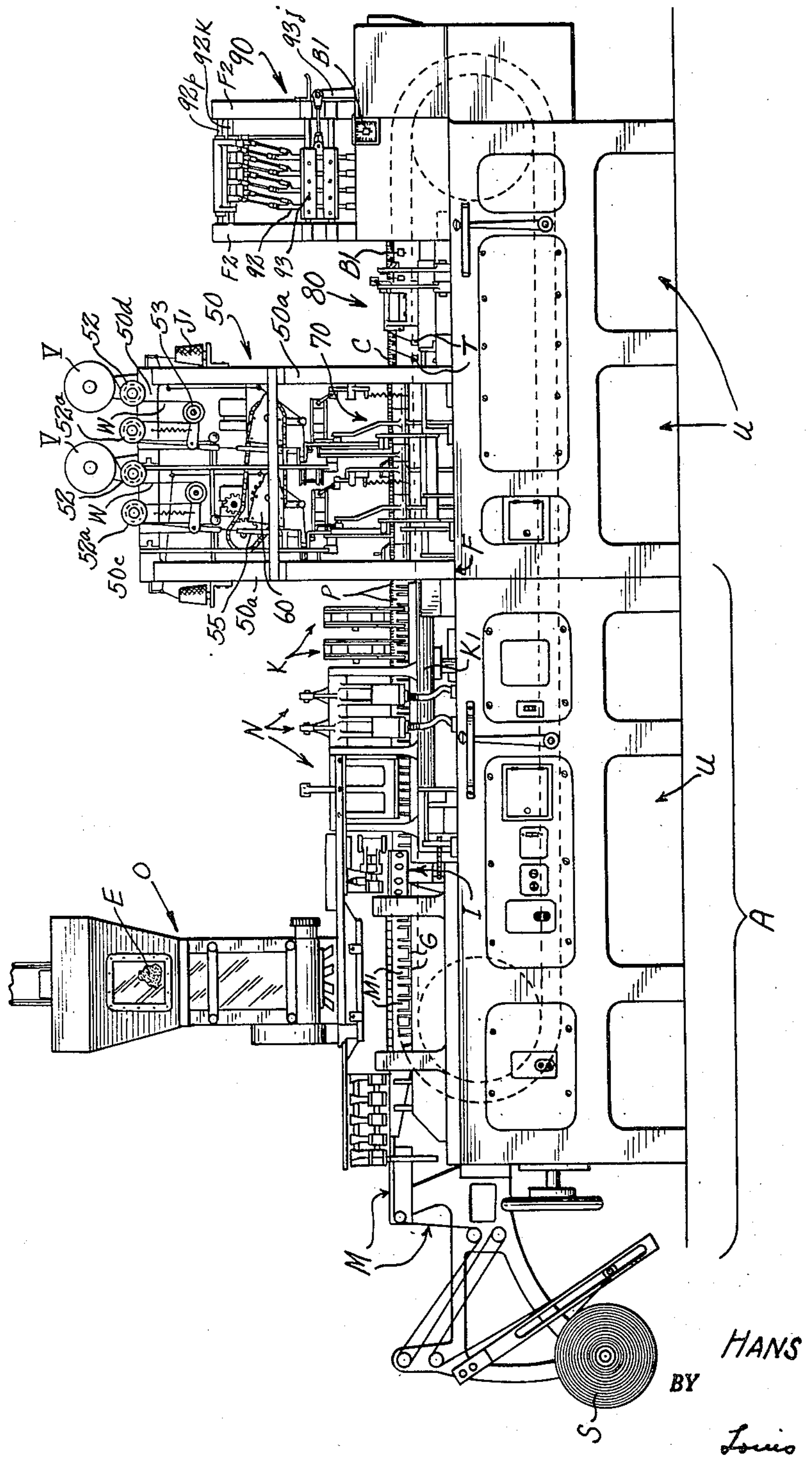
Figure 29:
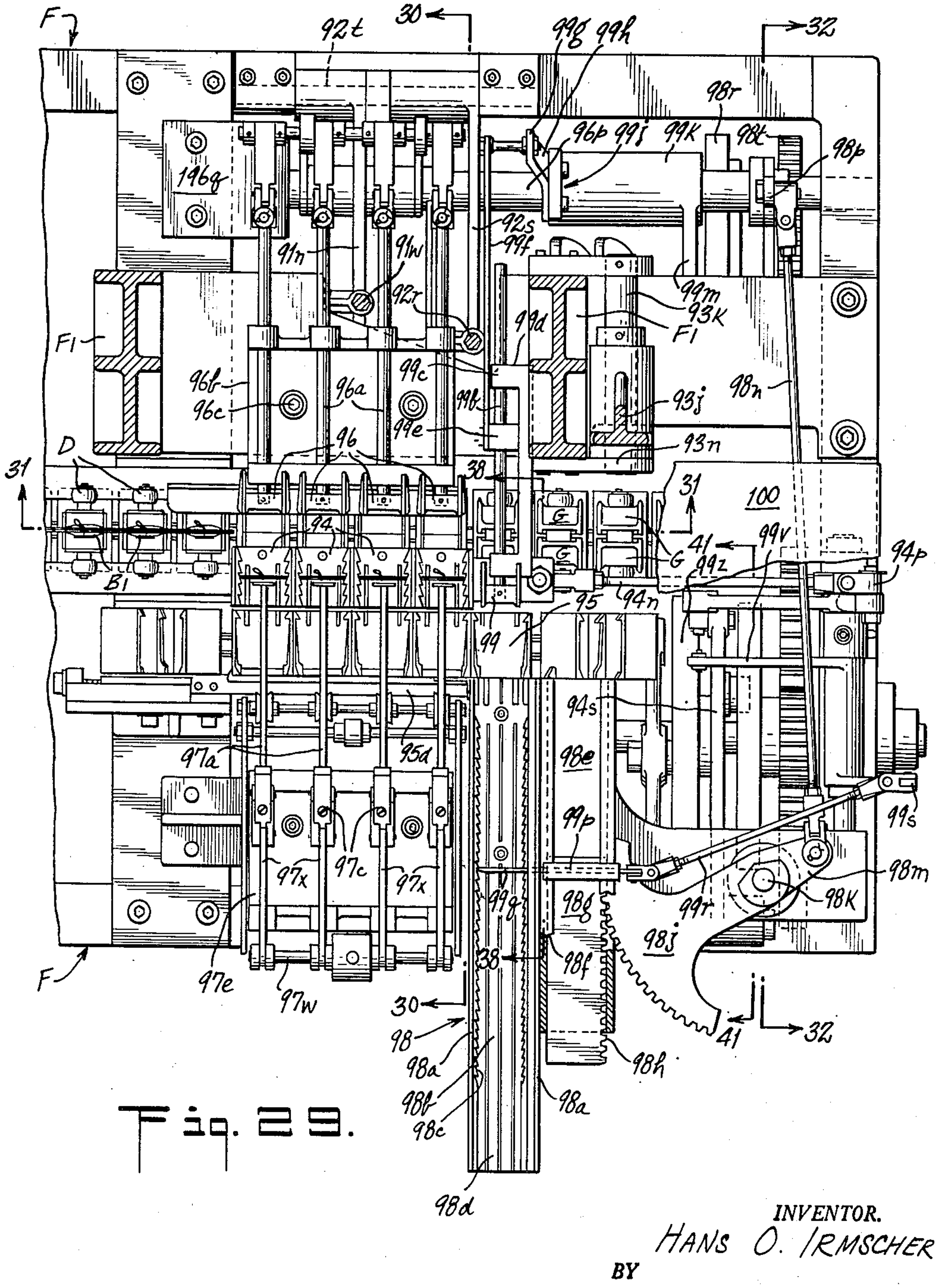

Fig. 29 is a top plan view of the portion of the improved apparatus unit shown in Fig. 1 showing the general construction of the group assembling and counting means for delivering the finished tea balls in counted groups directly to containers for distribution to the retail trade.

Figures 30, 30A, 30B:
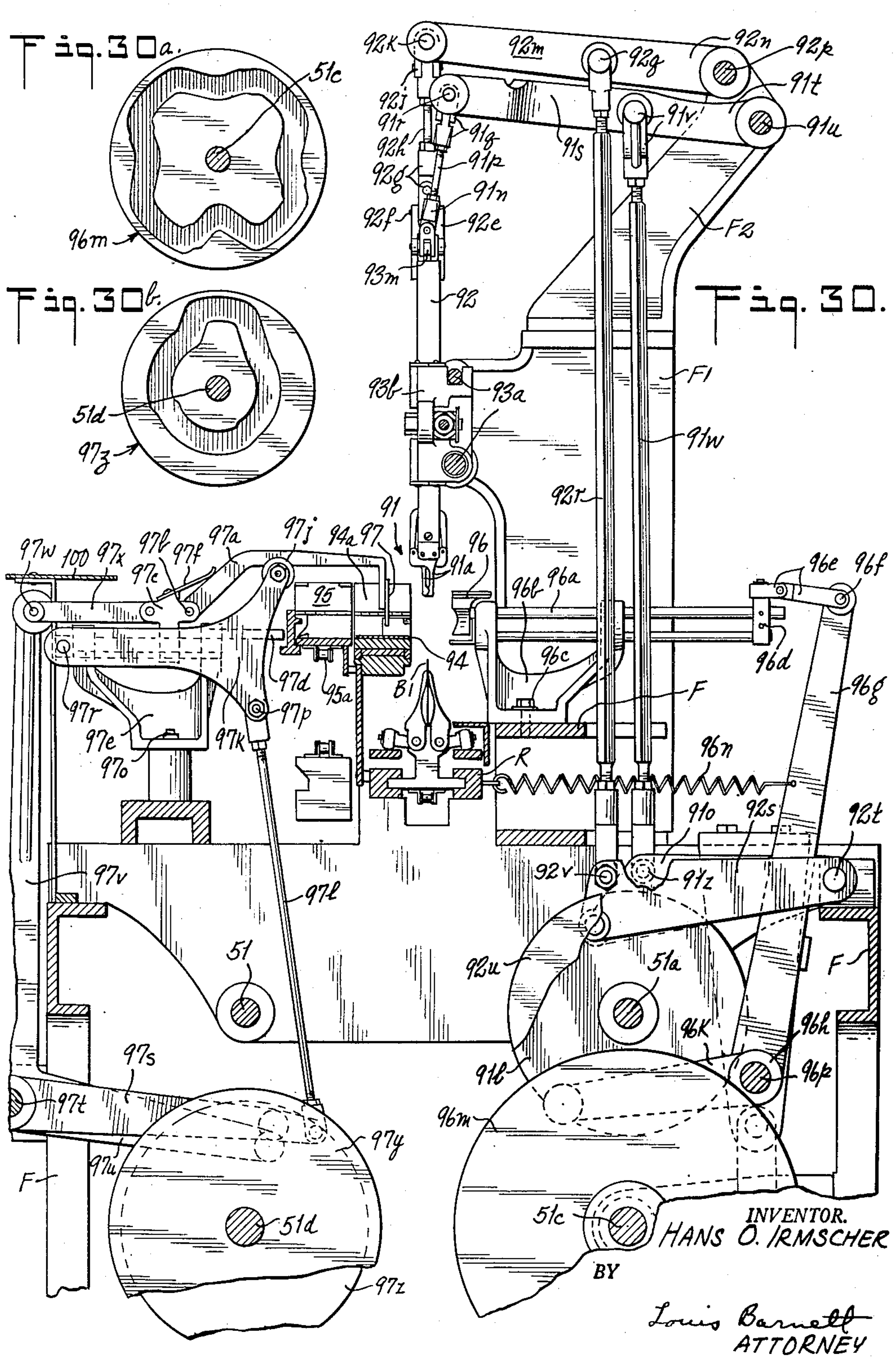

Fig. 30 is an enlarged sectional view taken on lines 30—30 in Fig. 29 showing details of portions of the means for assembling the finished tea balls from series line travel through apparatus unit prior to abutment grouping thereof.

Figs. 30*a* and 30*b* are side elevational views of opposite sides of the cam plate used for transmitting the various different movements required in timed relation for reassembling the finished tea balls from series line travel to abutment grouping in the operation of making up the predetermined delivery count for cartoning.

Figure 31:
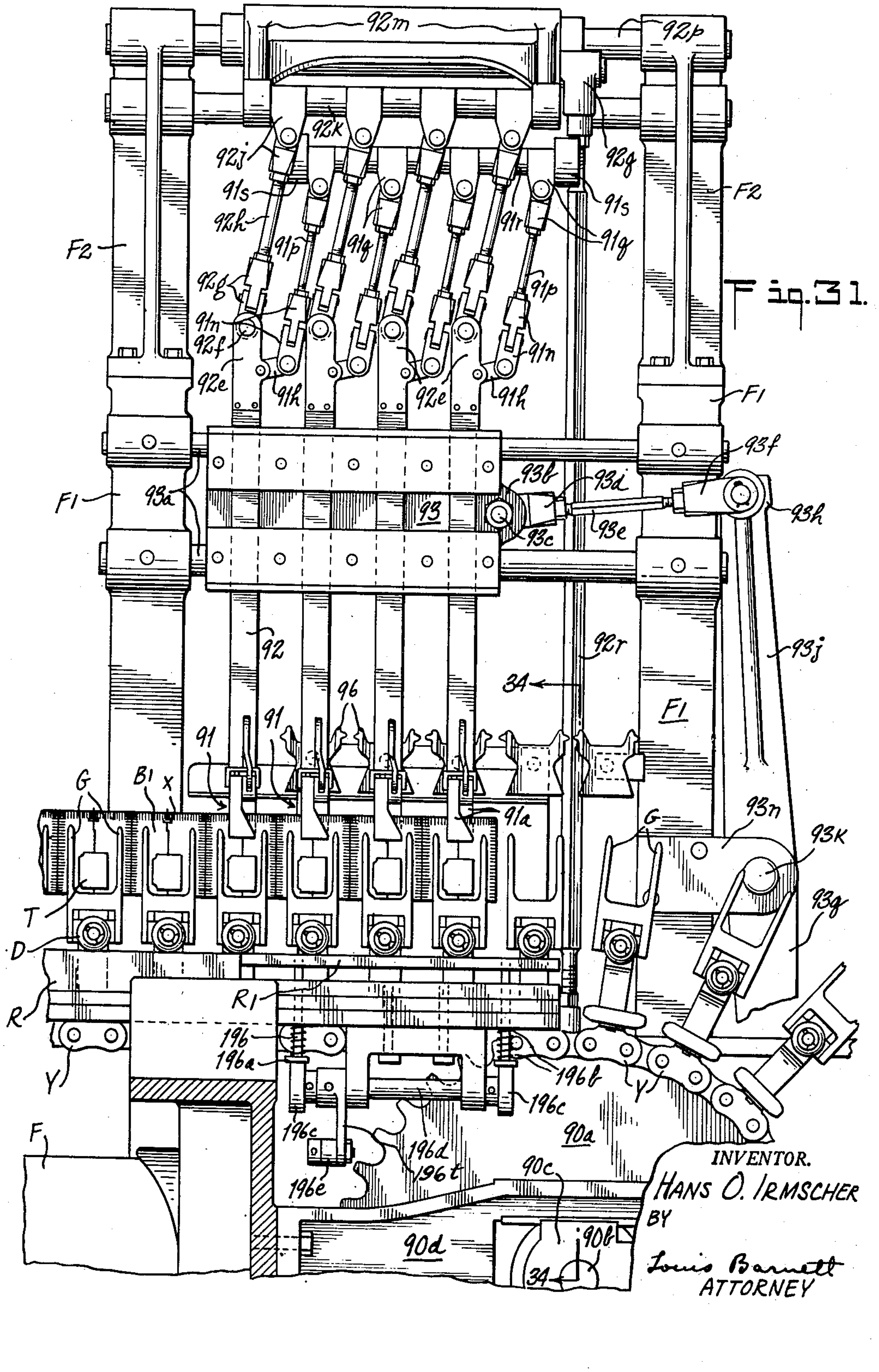

Fig. 31 is an enlarged sectional view taken on lines 31—31 in Fig. 29 showing the front side of part of the tea ball group assembling means.

Figures 32, 33, 33A:
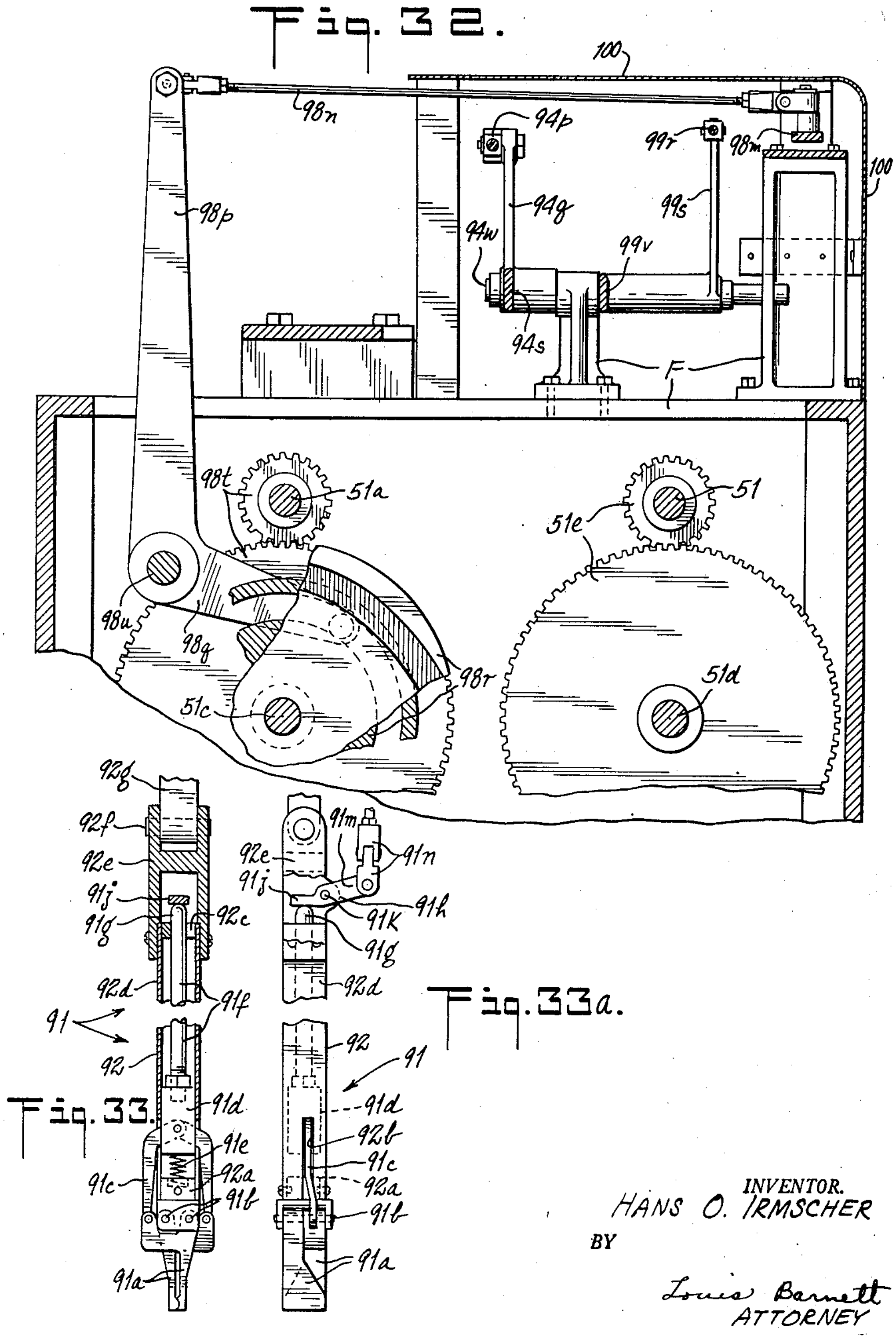

Fig. 32 is a sectional view taken on lines 32—32 in Fig. 29 showing details of the transmission power drive for said group assembling and counting means.

Figs. 33 and 33*a* are side and front elevational views, respectively, of fragmentary portions of the extension and retraction transferring tea ball gripper means for removing said finished tea balls from the chain conveyor series line travel.

Figures 34, 34A, 35:
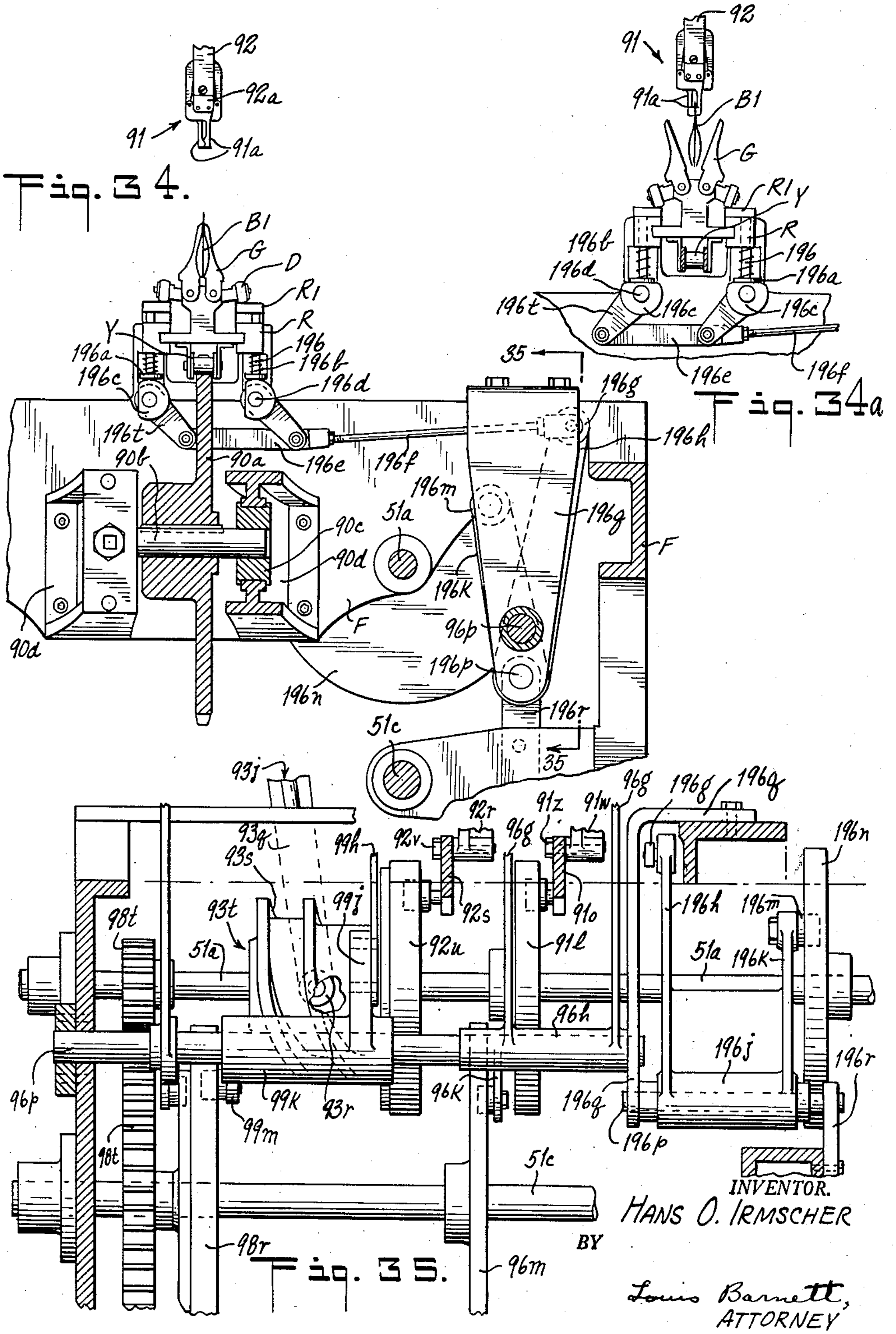

Fig. 34 is a sectional view taken on line 34—34 in Fig. 31 showing a fragmentary portion of the means for transferring finished tea balls from the chain conveyor series line travel and the power-drive transmission, the parts being shown in position with a tea ball still retained on the conveyor.

Fig. 34*a* is a fragmentary sectional view like portion Fig. 34 but showing a portion of the parts in position during the transferring operation.

Fig. 35 is a sectional view taken on lines 35—35 in Fig. 34 showing details of the power-drive transmission.

Figure 36:
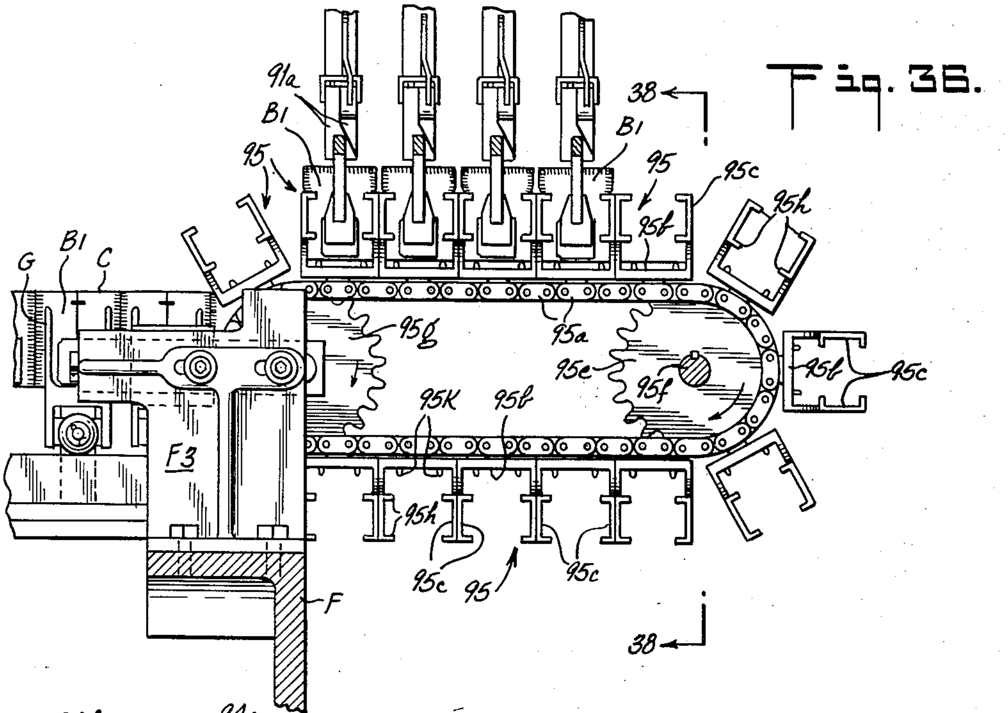

Fig. 36 is a front elevational view of a portion of the improved apparatus unit showing the continuous means for removing the finished tea ball from the chain conveyor series line travel for abutment grouping and counting.

Figure 36A:
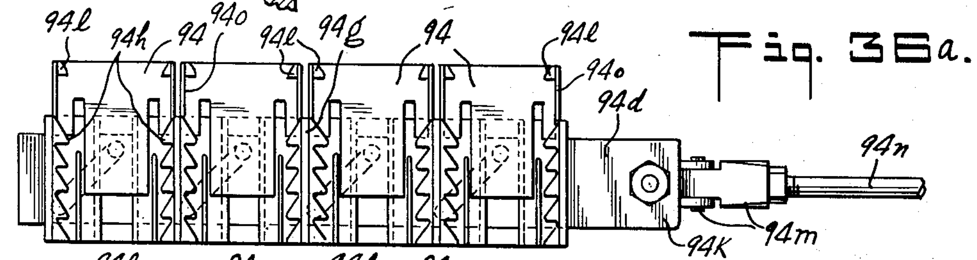
Figure 36B:
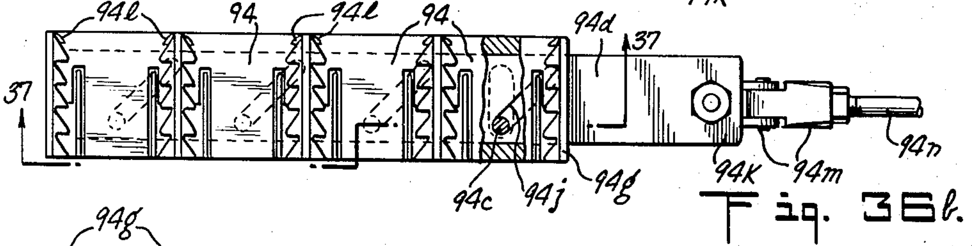

Figs. 36*a* and 36*b* are fragmentary enlarged views showing portions of different operative positions of abutment grouping and counting means.

Figure 37:
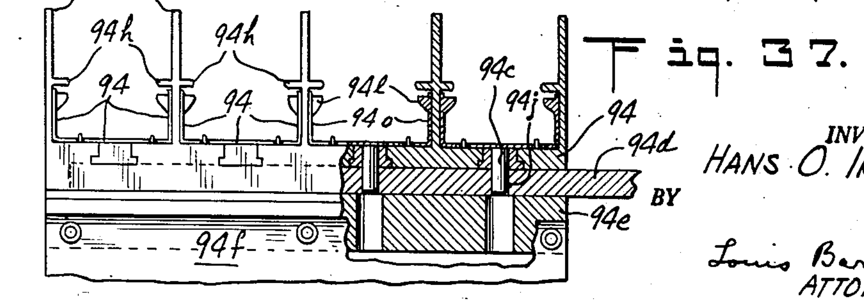

Fig. 37 is a sectional view as seen from line 37—37 in Fig. 36 showing details of a construction of portions of the abutment grouping means.

Figures 38, 39, 40:
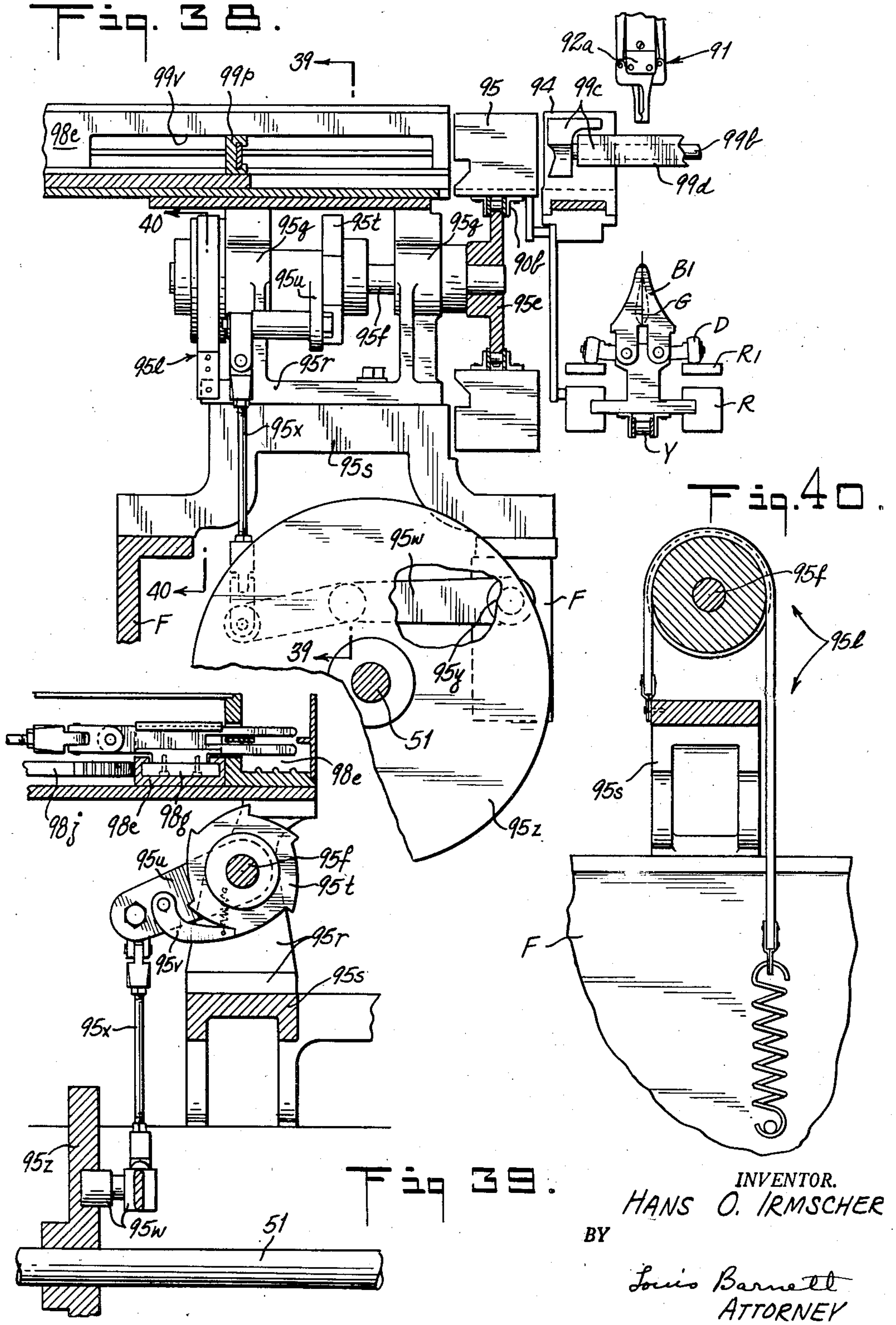

Fig. 38 is a sectional view in side elevation as seen from line 38—38 in Fig. 36 showing details of the means and drive transmission for transferring and removing the finished tea balls from the continuous chain conveyor series travel to the abutment grouping means.

Figs. 39 and 40 are sectional views taken on lines 39—39 and 40—40, respectively, in Fig. 38 showing details of the power-drive transmission parts for determining the movement of abutment grouping means shown in Figs. 35 and 38.

Figures 41, 42, 43:
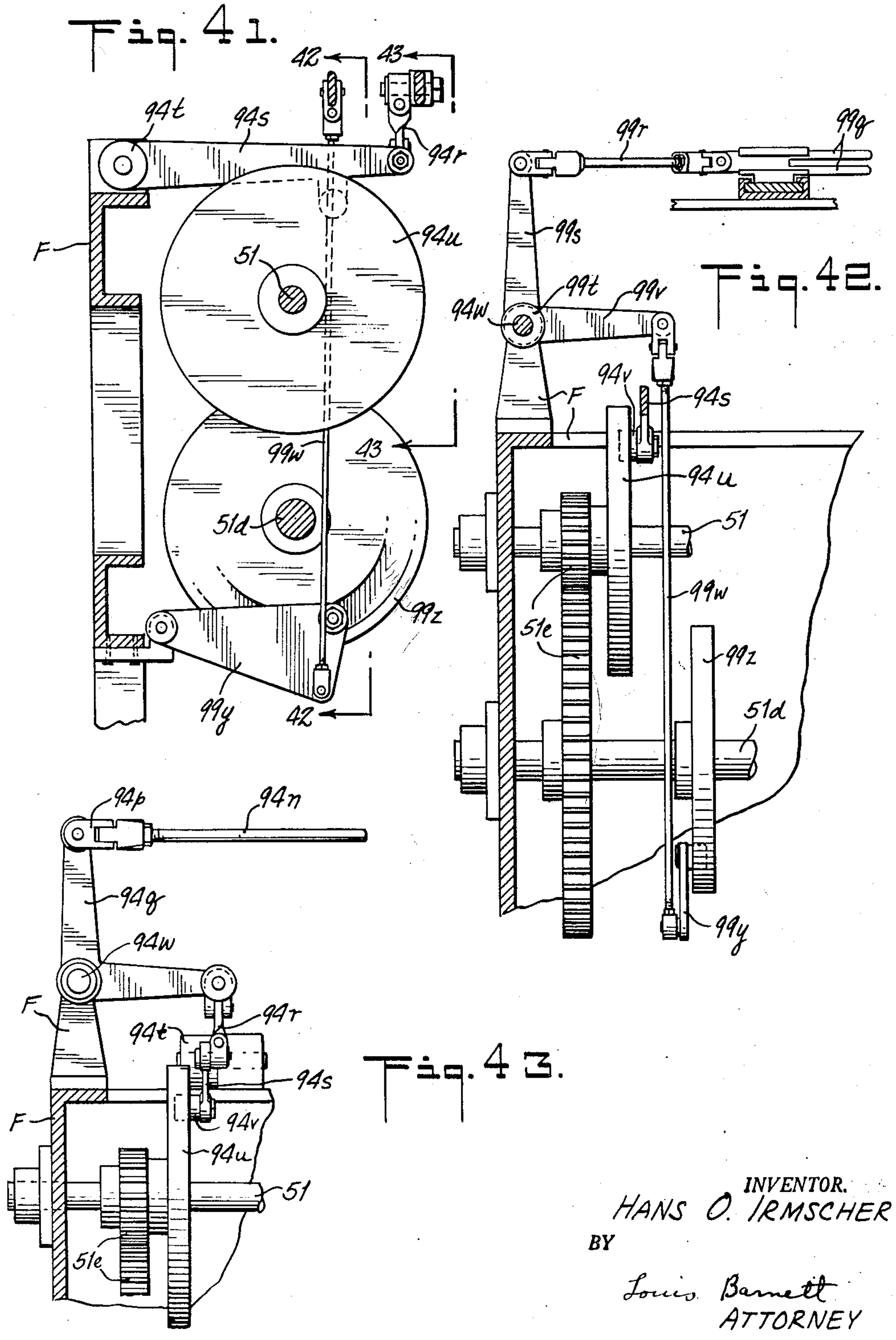

Fig. 41 is an enlarged sectional view taken on line 41—41 in Fig. 29 showing the timing cam-drive for controlling the movements of the abutment grouping and counting means.

Figs. 42 and 43 are sectional views of the portions of the timing cam drive of the abutment grouping and counting means taken on lines 42—42 and 43—43, respectively, in Fig. 41.

Figures 44, 45:
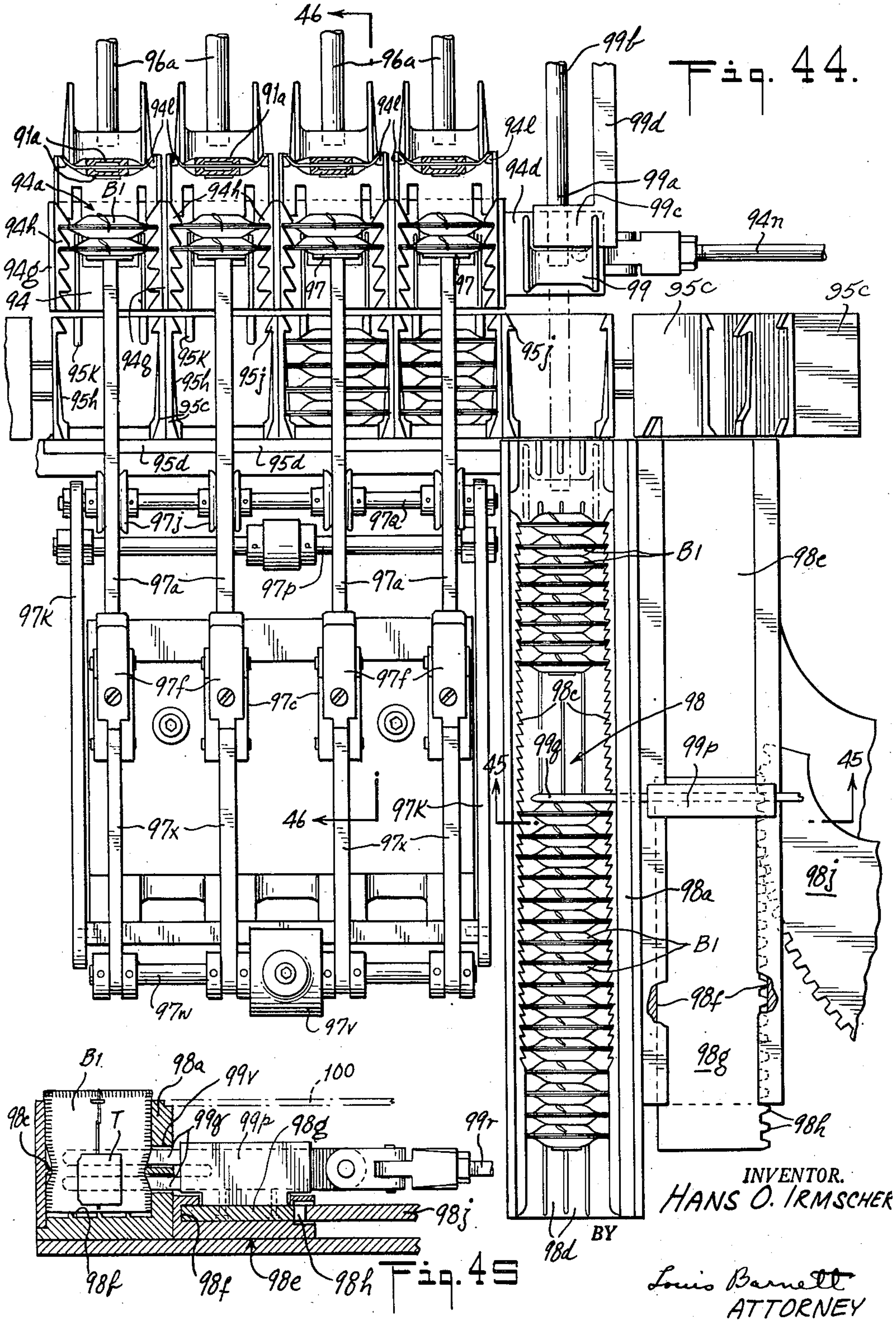

Fig. 44 is an enlarged top plan view showing a portion of abutment grouping and counting means of the improved apparatus unit.

Figures 46, 46A:
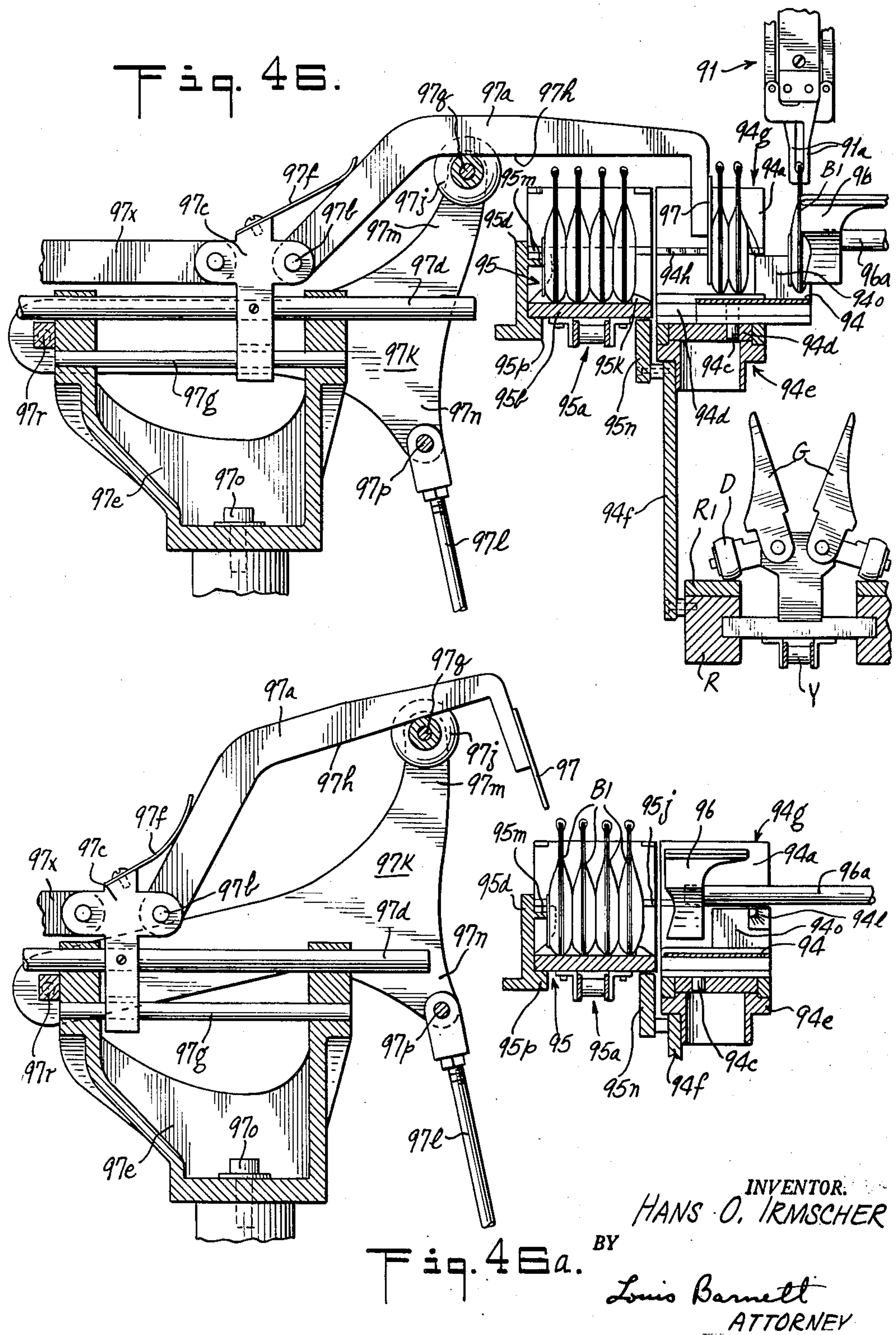

Figs. 45 and 46 are cross-sectional views taken on lines 45—45 and 46—46, respectively, in Fig. 44 showing details of a portion of the abutment grouping means before completion of one grouping, and Fig. 46*a* is a cross-section view like Fig. 46 but showing the operational position of the parts on completion of one grouping.

Referring in detail to the drawing, and more particularly to Fig. 1, U denotes generally a complete apparatus unit, which is seen to comprise interconnected co-acting parts, including a main machine portion A for manufacturing tea balls or filled packages P before the string handles and tags are attached, like that fully disclosed in applicant's United States Letters Patent No. 2,475,617, granted July 12, 1949. Machine portion A here shown however may be constructed to manufacture groups of four packages P in uninterrupted sequences instead of two shown and described in said Letters Patent.

A measuring device O of any suitable construction is also cooperatively incorporated in machine portion A to deliver in proper timed relation measured quantities of fluent material, such as tea E, here shown for filling bag sections M1 to produce said packages P, as for example like that shown in applicant's United States Letters Patent No. 2,490,056, granted December 6, 1949, using a Measuring Charge Supply Control Flow Mechanism for Automatic Packaging Machine Operations, as disclosed in applicant's co-pending application Ser. No. 127,720, filed November 16, 1949, now U. S. Patent No. 2,654,195. Said packages P may have the bag sections or envelope portions M1 thereof formed of filter sheet material M fed from a suitable arranged supply roll S.

Also as part of complete apparatus unit U, there may be provided a suitable automatic inspection means control I for supervising and detecting defective package filling operations such as shown in applicant's co-pending application Ser. No. 134,634, filed December 23, 1949, now U. S. Patent No. 2,715,807.

Directly over the path of travel of packages P on machine portion A beyond said control means I there may be provided as part of apparatus unit U, mechanism 50 which includes certain features of construction embodying the invention cooperating with machines portion A. Said mechanism 50 forms tags from a continuous strip or web of relatively thin pliably bendable sheet material W printed or unprinted on an outer side thereof and having an under heat-sealed coating on opposite side. Said sheet material W is longitudinally folded over in operation of said mechanism 50 so that said under side is in a face to face relation and is cut into sections each the length of one tag T which when heat sealed with one end portion of each string-handle H interposed between the fold of the tag section provide the individual tags T. As here shown, however, instead of having the other or free end portions Q of said string-handles H merely anchor-stapled against heat-sealed closure seam C of said filled packages P, said mechanism 50 as portion of a transferor 70 thereof has means for positioning said string-handle end portions Q in over-edge extending relation with respect to said closure seams C prior to anchor-stapling thereof, as hereinafter more fully described.

Figure 2:
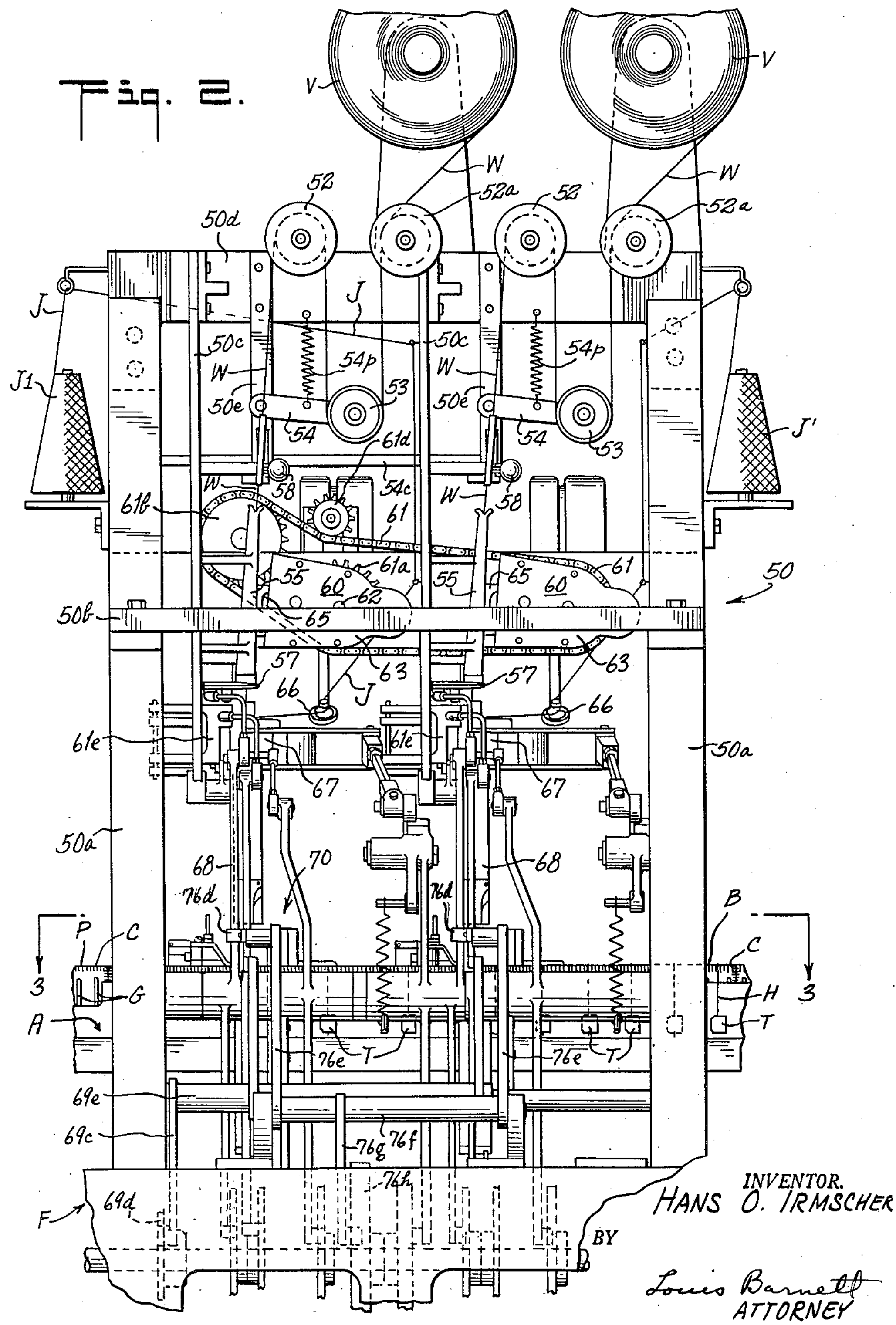
Fig. 2 is a front elevational view of a portion of the super high-speed automatic packaging apparatus unit shown in Fig. 1 incorporating a tag making and string-handle attaching in an over-edge extending relation mechanism constructed to embody one feature of the invention.

Said mechanism 50, as shown in Figs. 2 and 3, may include spaced apart side supports 50*a* firmly secured in straddling positions to upstand vertically from mid-portions of horizontally extending base frames F of machine portion A. Said supports 50*a* may be rigidly interconnected by a horizontally extending cross bar 50*b* and have parallelly disposed vertically extending rigid bracket members 50*c* spaced between said frame supports 50*a* to serve as intermediate support extensions thereof for the various component parts of mechanism 50.

Mechanism 50, when incorporated in apparatus unit U in the manner hereinafter described to embody the invention and as shown in the drawings in Figs. 1, 2, and 10, produces finished tea balls B from filled packages P manufactured by machines portion A, that is, provides each of said packages P with a dangling string-handle H and tag T in an automatic continuous operation. Said mechanism 50, however, also may, if desired, be used independently of, or combined with other like packaging machines in timed production relation, and as here shown, becomes cooperatively effective after top closure seam C of stringless and tagless tea balls P of the square pillow shaped type have been heat sealed as produced by machines portion A, in continuous sequence in high-speed quantity production. Mechanism 50, thus, automatically operates to supply and attach dangling string-handles H secured in an anchor-stapled over-edge extending relation each terminated by tag T to a suitable string-handle shortener non-tangle device 80 as required prior to delivery in counted groups by selector 90 at super high-speed for packing completely finished tea balls B1 in containers or cartons for delivery to the trade as it leaves the discharge end of apparatus unit U and as shown in Fig. 44.

As fully described in my said Letters Patent No. 2,476,617, said machine portion A in manufacturing said tea balls P has a suitable strip of heat sealing filter paper or similar suitable web material M continuously fed thereto from a suitably positioned roll S as shown in Fig. 1. Said web material M may be moved horizontally and longitudinally folded to provide a closed bottom and an open top, being gripped transversely the length thereof between continuously moving pairs of closely spaced pincer jaws G of machine portion A as shown in Figs. 1, 3, 4, 5, 6, 11, and 12. Said jaws G are carried on an endless chain belt Y and are controlled for effective opening and closing movement by suitable spring and camming action of rollers D riding on spaced rails R rigidly supported over frame F as is clear from Figs. 3 and 4. Each jaw G is made U-shaped or forked to grip said folded strip M transversely to form the successive empty bag sections M1 of said folded moving strip M with said bag sections M1 each extending between the forked portions of each pair of jaws G to leave top edge of the bag section open and projecting above the upper level of said jaws G before said heat-sealed closure seams C are formed.

As the empty bag sections M1 continuously travel with belt chain Y of said machine portion A they may be filled with infusing material, such as tea leaves, E, during the movement thereof by suitable filling or charging means, such as said measuring device O, through said bag section top edge openings after which transversely extending side closure between adjoining filled sections and said section top openings are successively heat-sealed, the latter providing said top closure seams C. As here shown four at one time are heat-sealed by suitably positioned electrically heated dies N provided for that purpose, for example, as shown and described in said Letters Patent No. 2,475,617. Filled bag sections P with permanent top closures C after being cut apart by suitable shearing means, such as knives K to form individual packages P continue uninterruptedly to advance through the machine portion A, uniformly spaced in close proximity, so that the adjoining edges are in substantial series abutment, that is, in edge to edge sequence.

In the present embodiment of the invention, as in application Ser. No. 79,034, said mechanism 50 automatically cooperates in timed sequence with the operation for heat-sealing top closure C just after knives K have been effective to leave individual tea-balls P each between a pair of jaws G as is clear from Figs. 1 and 2. Said mechanism 50 may be carried on supports 50*a* and bracket members 50*c* in spaced apart duplicate sets so as to have sufficient output capacity to service machine portion A when operating at most efficient and practical speeds to manufacture tea-balls P in groups of four at a time. Said mechanisms 50 when incorporated in apparatus unit U here described has been found to have an overall output in excess of 250 of string handles H and tags T for tea-balls P per minute. Said sets of mechanisms 50 may be individually provided with a suitably located supply of said tag tape material W from a reel V, which may be elevated above the level of supports 50*a* for continuously passing over spaced apart rollers 52 and 52*a* mounted on a horizontally extended top cross channel 50*d* and under a slack-drawing roller 53 positioned therebetween at a lower level, as is clear from Figs. 1 and 2.

Each roller 53 may be mounted for rotation at free end of a horizontally disposed lever arm 54, that is, suitably pivoted on a downwardly extension 50*e* from said cross channel 50*d* to permit swinging movement of said roller 53 toward and away from said rollers 52 and 52*a*, and a suitable tension spring 54*p* is provided for each of such horizontal arms 54 to counteract the weight of said slack tension roller 53 for controlling the effective slack tension on tag tape material W being unwound from the supply reels V, as shown in Figs. 1 and 2. A suitable tag tape feeder 60 mounted below the level of roller 53 is provided and driven in timed relation from the power-drive transmission of machine portion A, said feeder 60 being manually controlled through hand-gripping knob 58 in a manner like that shown and described in my said copending application, Ser. No. 79,034.

Each control knob 58 may also have connected to move therewith a suitably constructed resilient buffer which normally is spring held in an effective position to releasably clamp retain a portion of tag-tape material W after passing down from roller 52 so that manipulating of said knob 58 or actuation of said lever arm 54 out of said normal effect clamping position automatically releases the tag-tape material W permitting advancement through a folder member 55 in timed relation, as will hereinafter be described.

From Figs. 1 and 2, it is seen that the leading end portions of tape materials W pass vertically downward, and may be intermittently drawn, that is, advanced by the operation of said feeders 60 to pass through the clamping buffers when in released position into folder members 55 which partially fold the tape materials W longitudinally along mid-portions thereof, and then each pass down beyond lower ends of folder member 55 and shears 57 provided thereat.

Each tag tape feeder 60, as seen from Figs. 1 and 2 may have a power-drive chain 61, which through a sprocket 61*a* turns a shaft 62 journalled in a rigidly mounted housing or casing 63 for oscillating a finger-terminated member 65 in a compound reciprocation of up and down movement and toward and away from the path of advancing movement of the tag-tape material W which is passing through each folder member 55.

Said finger-terminated member 65 may be constructed to operate, during the movement thereof, to advance for engaging into, and to retract for disengaging from, uniformly spaced holes provided in tag-tape material W for drawing the latter in a downwardly direction when said member 65 is swept within folder member 55 during a downstroke, and moving clear of said holes during each upstroke thereof all in a manner as fully described in detail in said copending application, Ser. No. 79,034.

It has been found that satisfactory intermittent advancement of said tag-tape material W through folder member 55 may be had when each alternate downstroke of said finger-terminated member 65 is made effective for drawing the tag-tape material W in a downwardly direction of oscillation, that is, the remaining two upstrokes and one downstroke of every two reciprocating movements of finger-terminated member 65 are made ineffective and provide uniform dwell periods for the intermittent advancing movement in proper timed relation required to be given said material W.

Drive chain 61, as shown in Figs. 1 and 2, may be provided with a head sprocket wheel **61*b* mounted to turn and drive said chain 61 to operate said finger-oscillating member 65 in said timed relation, that is, with the steps for manufacturing filled tea-balls P by machine portion A, in cooperation with said transferor 70 of mechanism 50 in the manner hereinafter described. A suitable chain slack takeup means may be provided, as for example, idle sprocket 61*d***.

A suitable fold retainer of spacer means carried just below lower end of each of said shears 57 is mounted to swing between and out of the partially folded cut tag length of tape material W to prevent the latter against being completely folded together, a swingable cutting blade of said shear 57 having a stationary blade thereof located at the lower end of folder member 55 to intermittently cut length of material W after the latter has passed the shears 57.

Both said folder retainer and shear operations may be driven to turn with a main drive shaft 51 of machine portion A and are so constructed and arranged that the tag length is caused to be severed by shears 57 from tag-tape material W while said fold spacer means is swung to be interposed between the partially folded cut tag lengths of tape material W to insure passage midway said cut tag length of a string-strand J, a portion of which is to provide string handles H.

Said string-strand J may be supplied by any conveniently located suitable source, such as, a wound spool J1 in any well understood manner, and may be directed by a suitable guide block and tension fitting 66 as shown in Fig. 2, to extend in a horizontal direction transversely with respect to the vertical path of movement of tag-tape material W, and then to pass vertically downward to a position substantially midway said cut tag length of folded material W. Said tag length with the string strand J are then confined and directed to a suitable tag and string heat-sealer 67 positioned directly below the guide block-fitting 66.

As shown in Figs. 1 and 2, to positively convey each cut tag length in its movement from the lower end of the folder member 55 to tag and string sealer 67, there may be provided, as shown in Figs. 4, 6, and 7, a suitable carrier means mounted for reciprocation on a slideway in the path of movement of said sheared tag length and driven in timed operational relation with power shaft 51, as for example, like that described in my said aforementioned copending application, wherein as each tag length is successively sheared from the leading end of tag material W after passing said lower end of folder member 55, it then is seized, delivered to, and then released between electrically heat sealing companion dies of said tag and string sealer 67. Between said heat sealing dies the folded tag length with interfolded string strand J pass, the heat sealing operation taking place in timed relation with the continuous movement of filled package P by machine portion A.

Just before said heat sealing operation, a predetermined length of strand J that is to form string-handle H is drawn between the partially folded tag length with said spacer means in effective position therebetween. In accomplishing these results, the said predetermined string length portion of strand J that is to form the string-handle H follows downwardly by being pulled by a preceding heat-sealed tag T and string-handle H before the latter is severed and is passed into a chute 68 after said tag T has been released from between said dies of said tag and string sealer 67.

Chute 68 may slope in an angularly downward direction and may have an upper wall portion **68*a* formed to resiliently retain each tag T passing thereunder to temporarily remain extended partially beyond bottom or lower end of chute 68 before being drawn therethrough. Rear wall 68*b* of chute 68 may communicate with inlet end 68*d* of conduit 68*e*, portion of which is shown in Fig. 4, the other end of said conduit being connected to a suitable exhaust fan driven in any well understood manner, for example, as shown in my said copending application, to draw cooling air from chute 68** and around the heat-sealed tag T, and also to keep the adjacent surrounding machine parts about said tag T and string-strand J free from foreign or loose materials.

As each heat-sealed tag T is drawn to said partially extended position beyond the end of chute 68, clipper blades **69*a* of a string cutter means, denoted generally as 69, severs string-strand J close to the leading or lower positioned end of tag T by actuation through suitable linkages 69*b*, in proper timed relation through roller terminating cam follower 69*c* mounted on rock shafts 69*e*. Said cam follower being driven by cam 69*d*, which is mounted to turn with power drive 51** as shown in Figs. 3 and 4.

Mounted adjacent said cutter blades **69*a* there is provided a movable strike member 76, as shown in Figs. 4, 6, 7, 8, and 9, for controlling the effective gripping action of string-strand J between clamp arms 75*a* and 75*b* of transferor 70 just prior to severing of said string-strand J by said cutter means 69. Said strike member 76 may be mounted in a slide guide 76*a* to terminate one end of a push bar 76*c* which through a linkage 76*d* pivotally connects with an upwardly extending arm 76*e* of a bell crank for rocking with a sleeve shaft 76*f* thereof. The latter has an extending roller terminating cam follower 76*g* which is actuated by a cam plate 76*h*, mounted to turn with power drive 51, whereby said strike member 76 actuated in timed relation for pressing against clamp arm 75*b*** to permit engagement and gripping strand-string J prior to and after severance thereof, as is clear from Figs. 7, 9, and 10.

Cam follower **76*g* also may be associated to control movements of a portion of transferor 70 in proper timed relation by providing a downwardly extending arm 76*j* secured to said arm 76*e* and through a short link 76*k* connects with a sliding bar 76*m* having a jaw release trip camming end 76*n* which is projected into the path of movement of a pair of tong jaws 71*a* and 71*b*, mounted to slide with a shoe 71 on slideway 70*a*, for releasing a tag T terminating a string-handle H gripped by said tong jaws 71*a* and 71*b*** when in an extreme retracted position, as shown in Fig. 7.

Reciprocation of said shoe 71 in proper timed relation on slideway **70*a* may be provided through a curved lever 70*m* having an end pivoted at 70*n* with a connecting rod 70*p* which carries shoe 71, the other end of said lever is supported on a rigid frame extension F3 and mounted for rocking with sleeve shaf 70*q*. The latter also has extending therefrom, an arm 70*r*** and a roller cam follower 70s, disposed in angular relation, said arm 70r connecting with a tension spring 70t and said cam follower 70s being actuated by a cam plate 70u against the action of said spring 70t, as shown in Figs. 3 and 4.

Each tag T extending from said lower end of chute 68 after the string cutter means 69 has severed string strand J, is grasped by said tong jaws 71a and 71b carried by said shoe 71. Said slideway 70a may include a rigid inverted angle supporting track 70b extending along an under side thereof to guide said shoe 71 in a general angular direction aligning with the chute 68. Gripping jaw 71a may be mounted relatively stationary with respect to the shoe 71, and jaw 71b pivoted to the latter. Said jaw 71b normally is urged into a gripping position with respect to jaw 71a by a suitably positioned compression spring 71d, as when said jaws 71a and 71b, are fully projected and act to grip the tag T and move with the shoe 71 from the position shown in Fig. 6 to an extreme retracted position as shown in Fig. 7. Track 70b and associated parts may extend and be proportioned to determine the desired length of the string-handle H through suitable control of timed movements of the parts of said transferor 70, as for example, by providing a pin 70w arranged and used in conjunction with a switching gate or frog 70h, in the manner similar to and as shown and described in my said copending application for a like construction and operation.

As is clear from Figs. 4 ,6, and 7, pivoted jaw 71b may remain in an effective tag gripping position during the entire downstroke and the upstroke travel of shoe 71 to just a short distance before reaching end gate 70h when jaw 71b is caused to swing into a releasing position. Shoe 71 with jaws 71a and 71b when in fully projected position, reach said jaws up above the level of string cutter means 69 and just below of bottom end of chute 68 so as to seize the next tag T thereat as shown in Fig. 4. Just before string cutter means 69 clips string strand J, free end Q of string-handle length H cut off from the string strand J is seized by a pair of swing-over clamp arms 75a and 75b, portions of transferor 70, to position the said string-handle end Q in an over-edge extended relation with respect to said package heat-sealed seam C for stapling in a desired permanently attached position.

As hereinbefore stated and shown in Figs. 4 to 12, inclusive, a feature embodying the invention includes as part of mechanism 50 said improved transferor 70 and the incorporation thereof in apparatus unit U so that packages P after being filled and sealed, and having advanced through machine portion A to one of the duplex string-handle forming and stapling portion of mechanism 50, as for example, to the position shown in Fig. 4, where the tag T has been formed to terminate the string-handle H and is about to be brought into position for stapling attachment, the transferor 70 which is mounted along the path of movement of filled packages P automatically comes into operation to position the string-handle end Q in said over-edge extended relation as is clear from Figs. 5 to 10, inclusive, just before the staple setting operation takes place and in timed relation so that the uniformly constant advancement of said package P through machine unit U is not interfered with.

Thus, instead of engaging and transferring each cut string-handle end Q to the outer surface of a package closure seam C and stapling same thereto in direct abutment, as shown and described in my said copending application, Ser. No. 79,034, the present invention provides an improved construction which comprises clamp arm 75a of arcuate-shape having a terminal lip or ledge 75c against which said string-handle end Q on being cut by clipper blades 69a as hereinbefore described is releasably retained by a pressure end 75d of short clamp arm 75b, the latter being pivoted at a mid-portion thereof on clamp arm 75a, as at 75f. The other end 75e of clamp arm 75b may be provided with a compression spring 75g for normally urging said clamp arm pressure end 75d into an effective position for gripping string-handle end Q against terminal ledge 75c, as is clear from Figs. 10 and 11.

Said clamp arm 75b may also be provided with a trip projection 75h which not only co-operates with said striker member 76 for controlling said effective gripping of string-strand J as hereinbefore described but also controls in timed relation releasing of effective gripping of string-handle end Q after severance by said cutter means 69 when acted on by pressure against an end or finial 76x of strike member 76y after said string-handle end Q has bearing position to extend about package closure seam C for stapling, as shown in Figs. 10a and 10b.

End 75j of clamp arm 75a, opposite said terminal ledge 75c, may be mounted for rotation on a horizontally disposed pivot pin 77a which is carried by one end of a link 77, for swing clamp arms 75a and 75b during the effective gripping of string-handle end Q into said over-edge extended relation as shown in Figs. 5, 6, 10, 10a, and 11. The other end 77b of said link 77, may have power supplied thereto for said swinging movement in proper required timed relation in any suitable manner, as by a plate-cam drive 77c mounted to turn with power drive-shaft 51a, said drive 77c having a roller 77d carried on a downwardly extending straight arm 77e of a rock shaft 77h which has an upwardly extending curved arm 77f that terminates in a pivotal connection 77n with one end 77k of a length-adjustable bar 77g.

The other end 77j of said bar 77g may pivotally connect with one arm 78a of a lever 78 which is mounted to swing by mid-portion thereof on vertically disposed pin 78b, and the other arm 78c of lever 78 may connect with pivoting shackle end 78d of an adjustable rod 78e, the latter extending to pivoting shackle 77p at end 77b of said link 77, as shown in Figs. 3, 5, 8 and 8a and 10.

To retain each string-handle H in proper position while being over-extended about a moving package closure seam C before stapling, suitable clamping means 79 which regulate the section of string strand J that is to form string-handle end Q, to the moving portion of package closure seam C to be stapled, may be provided to include outer or front elongated lever member 79a and in inner or rear elongated lever member 79b, said levers 79a and 79b being mounted to engage and retain the string-handle end Q in said over-edge extended position against the front, top and rear sides of said closure seam C, as is clear from Figs. 8, 8a, 10, 10a and 11.

Outer lever member 79a may be pivoted at one end at 79c and may be actuated at a mid-portion thereof, through a suitable loose connection 79d, such as formed by a pin and slot, and with one end 79e of a push bar 79f. The other end of push bar 79f may terminate in a screw length-adjustable pivoting shackle 79g which connects as at 79h with an upward extending arm 79j of a bell crank 79k that rocks on a shaft 79m. Another arm 79n forming said bell crank 79k may terminate in a roller 79p which through plate cam 79q is driven from power drive shaft 51a as shown in Figs. 3 and 5.

Inner lever member 79b, as seen from Figs. 8 and 8a, may also be pivoted to swing on a mid-portion 79s thereof, and has an end connected to a link 79t which passes through said loose pin and slot connection 79d under push bar end 79e. Said link 79t may connect with an end of a tension spring 79u for normally urging said gripper 79b toward the rear side of the package closure seam C, said gripper 79b having an upstanding inverted L-shaped prop 79v to prevent the string-handle end Q from crushing said closure seam C during the string-handle anchoring operation as shown in Figs. 10 and 10a.

Required movement in the direction of travel of the package closure seams C, for each pair of clamp arms 75a and 75b as well as to swing the grip portions of string-handle end Q from the position shown in Fig. 10 to that shown in Fig. 10*a*, is provided by suitable means in proper timed relation while positioning string-handle ends Q for stapling to the advancing package closure seams C. As shown in Figs. 3, 8, and 8*a*, said means may comprise oscillation assemblies 74, each having a carrier base **74*a* provided with an upstanding pin 74*c* which is mounted for limited sliding movement to and fro in parallel spaced relation to the path of movement of said packages P on a trackway support 74*b***.

Said carrier bases **74*a*, each has mounted for movement therewith clamping means 79, on trackway support 74*b*, through said pivoting pin 74*c*, which may be terminated by a pinned swivelling block 74*d*. The latter carries front end of a shift lever 74*g*, which extends rearwardly of said base carrier 74*a*, said shift lever 74*g* being pivotally mounted on mid-portion thereof at 74*f*** a bolted frame extension portion F4.

Rear end **74*j* of said shift lever 74*g*** pivotally connects to a suitable intermediate timed power drive, such for example to include reciprocable bar K1 which operates knives K or heat-sealing dies N of apparatus portion A, moving in timed relation with said continuous advancement of packages P.

During the above described operations, after tag T and string-strand J is drawn down into fully retracted position by jaws **71*a* and 71*b*, that is, from that shown in Fig. 7 to that shown in Figs. 4 and 6, and just before the shears 69 cut a predetermined length of string-strand J to provide handle H, transferor clamp arms 75*a* and 75*b* become effective to grip portion of said string-strand J which is to form said free end Q, as shown in Fig. 10. On cutting said string-strand J by shears 69, as shown in Fig. 7, said clamp arms 75*a* and 75*b* are swung down to bring the string-handle end portion Q and is retained by said levers 79*a* and 79*b*** in said over-extending relation about said closure seam C, as is clear from Figs. 10 and 11.

To release string-handle end Q from the grip between clamp arms **75*a* and 75*b* after being swung the required distance about and beyond package closure seam C and positioning string-handle end Q for stapling, end projection 75*h* of clamp arms 75*b* is tripped by striker member end 76*x* which is effective to move arm pressure end 75*d* away from clamp ledge 75*c* against the action of spring 75*g*. Said tripping action may be made to occur in timed relation when string-handle end Q is ready for stapling in said over-extending relation about closure seam C, the timing of said tripping by striker member end 76*x*** being arranged, as shown in Figs. 8, 8*a*, and 10*a*, by oscillation movement of each stapler 72.

The operation of the portion of the transferor 70, above described on the advancing packages P, with the string-handle ends Q in place in over-extending relation about closure seams C, are automatically applied in timed relation by wire stapler 72.

Wire stapler 72, which with the tag and string-handle H portions and transferor 70 form mechanism 50 may be of a suitable construction and as here shown in Figs. 3, 8, 8*a*, and 10*b*, is like that shown and described in my said copending application, said stapler 72 having a driving shaft **72*a* provided with overhung end which is driven to turn by main power-drive shaft 51*a* through a set of bevel gears 73*u* and a vertically disposed secondary power drive shaft 51*b***.

Said stapler 72 has staple forming drawn wire Z supplied thereto from a suitable source (not shown) by being inserted through a conduit 73 and between size and forming rollers **73*a* and 73*b* which are adjustable by finger screw 73*c*. On rotation of said stapler shaft 72*a* with cylinder cam 73*d* mounted to turn therewith various slide members thereof are actuated to cut off a portion of wire Z and to bend and shape end piercing prongs thereon to provide a U-shape structure, that is, an open prong staple on diehead 73*e*. Thereafter sliding the latter forwardly toward an anvil 73*f* carried by said slide members, with the package closure seam C passing between die head 73*e* and anvil 73*f* staple X is permanently clinched anchoring string-handle end Q positioned by transferor 70** in said over-edge extending position at high speed and in timed relation to conform to the requirement of continuous advancing movement of said packages P being operated upon without interruption.

Said requirement is here fulfilled by having each stapler 72 mounted for oscillation on a bracket **73*h* journalled to turn on said vertical power-drive shaft 51*b***, the latter being supported from machine frame F in the same manner as described and shown in my said copending application.

For giving the oscillating movement to bracket **73*h* with stapler 72, a horizontally disposed plate cam 73*j* having groove 73*k* as shown in Fig. 3, may be provided, said plate cam 73*j* having a vertically extending shaft 73*t*, which in turn through meshing gear 73*s* connects with vertically extending drive shaft 51*b*. Cam plate groove 73*k* has a roller 73*m* riding therein to actuate a follower 73*r* connecting with bracket 73*h* for giving one of said staplers 72 the required oscillating motion, and a tie rod 73*p* pivoted at opposite ends to extend between said brackets 73*h* may be provided for swinging both staplers 72** in unison.

The timing operation and spacing of the two staplers 72 may be such that, as here shown, where mechanism 50 is incorporated in machine portion A which fills and heat seals closure seams C of four consecutively filled packages P as a single group from the continuous moving series packages P, that simultaneously two staples X are made and applied to anchor string-handle ends Q in over-edge extending relation of two packages P, the latter then being spaced apart with four intervening packages P in the advancing path, as shown in Fig. 3.

Thus it is seen that the rate of attaching string-handle ends Q by each stapler 72 is twice the group rate of making packages P, by machine portions A, and that the rate of forming tags T with string-handles H in consecutive sequence by mechanism 50 along each of two paths working in unison corresponds in number to one-half of the filled packages P being produced by machine portion A.

Staplers 72 and transferors 70 described above cooperate in timed relation to automatically conform with the production rate of packages P with closure seams C passing from mechanism 50 as packages B each provided with a stapled suspending string-handle H and tag T to string-handle shortener non-tangling device 80.

Said packages B each having a string-handle end Q stapled to closure seams C thereof in said over-edge extending relation while continuing through the apparatus unit U have mid-portions of each of the string-handles H subjected to a non-tangling operation as said packages B continue to advance without interruption directly through shortener device 80. The latter may be incorporated in apparatus unit U as shown in Fig. 1, and in detail in Figs. 14 to 28, inclusive. The string-handle shortening operation of said device 80 in the manufacturing of completely finished packages B1 will be clear from Figs. 12, 16 and 16*a* and the following descriptions.

Referring now to Figs. 14, 15, 17 and 18 the filled packages B with said depending string-handles H stapled to closure seams C pass the latter between a pair of horizontally disposed guide bars 86, front guide bar **86*a* thereof being parallelly spaced from rear guide bar 86*b* thereof by a spacer fitting 86*c*. Guide bars 86*a*, 86*b* and fitting 86*c* assembly may be retained in proper required position over the path of movement of packages B by spaced apart supporting straps 86*d* which may be bolted to upstand on inverted L-shaped channel bars 86*e*, the latter being secured to inner rail R over chain belt rail roller D by bolts 86*f*. As here shown when packages B, while constantly moving extend to said string-handle shortener device 80 that is, a group of four package closure seams C pass between the guiding guard bars 86, the four packages B are simultaneously pierced through a middle portion of each by a set of correspondingly spaced apart needles 87. Said needles 87 are arranged to be projected from the rear to the front through of each successive similar groups of packages B during said passage thereof through said shortener device 80** without interruption of the constant advancing movement of packages P and B through apparatus unit U.

Each needle 87 may be constructed with pointed end 87*a* and having a hook-shaped or open eye 87*b* inwardly from the end 87*a*, an open part of said eye 87*b* being positioned to face against the direction of travel of the filled packages B through the apparatus unit U. Needle pointed ends 87*a* preferably are each made sharp and relatively thin so that slits N1 pierced through each of the filled packages B by needle 87 are normally closed leaving no passages thereat. Slits N1 may each be made in length substantially twice the diameter of the strand J forming the string-handle H so that when the latter is drawn through a slit N1 after each needle 87 has been withdrawn, a non-tangling loop L, is formed, as shown in Figs. 16 and 16*a*, and is firmly gripped around the portion of said string-handle loop L passing through slit N1, releasably retaining same. Also when each loop L is withdrawn, slit N1 of a package B, when being used as a teaball for brewing, will be practically closed in self-sealing fashion to prevent any portion of the contents to pass therethrough.

As shown in Figs. 17 and 18, the piercing movement of needles 87 are timed to be projected centrally through each filled package B, below the anchoring staple X, thereof, and when said needle points 87*a* and open eyes 87*b* reach through the front sides of the filled package B, as shown in Fig. 20, the open eyes 87*b* of needles 87 are each caused to releasably engage with mid-portions of string-handles H each with a depending tag T which normally slidingly ride along a front apron plate 86*g* provided, as shown in Figs. 17, 18, 21, 24 and 25 the latter being secured to extend part way in front rail R by screws 86*h*.

The portion of each string-handle H after being engaged, are retained in needle open eye 87*b* until the needles 87 are fully retracted beyond the rear side of filled package B, as shown in Figs. 24 and 25. To smoothly draw the loop forming string-handle portions through slits N1 on retraction of the needles 87, there are provided lever stradling grippers 88 each terminated by spaced apart, that is, hook end double members 88*a*. Said grippers 88 may each be pivotally mounted to swing with a rocker arm 88*b* on vertically disposed shaft 88*c* as shown in Figs. 14 and 15, and are so constructed and arranged as to swing said hook end members 88*a* of each just freely passing above and below the needle 87 when in piercing position and during said constant advancement of the filled packages B as is clear from Figs. 17, 20, 20*a*, and 21.

Needles 87 may each be mounted for sliding movement with extending front ends of horizontally supported push and pull bars 89, each mounted in spaced apart relation on a bearing carrier 89*a*, proper required reciprocation being provided through adjustable connecting rods 89*b* each of which may be mounted for universal swinging movement in any suitable manner, as by means of pivoting shackles 89*c*, 89*d*, terminating opposite ends of connecting rods 89*b*, to permit movement in both horizontal and vertical planes. Said pivoting shackles 89*c* and 89*d* may be connected through suitable timed power transmission means, such as a roller terminated cam follower 89*e* actuated by plate cam 89*k* connecting with power drive 51*a*, as shown in Figs. 14 and 15. Cam follower 89*e* may form one arm of a bell crank 89*m*, the other arm 89*n* thereof being pivotally connected at 89*p* with shackle 89*q*, said bell crank 89*m* being mounted to rock on shaft 89*r* which may be supported by bracket 89*s* bolted to the apparatus frame F as shown in Figs. 14 and 15.

Cam 89*k* and follower 89*e* when operating project and retract said slide bars 89 and needles 87 in unison, through the above described time power transmission means, while in addition, bearing carrier 89*a*, on which shackles 89*c* with ends of length adjustable rods 89*b* are mounted, are given limited to and fro sliding movement in a path parallel to the path of movement of the packages B on a bed 89*h*.

Sliding movement of bearing carrier 89*a* on bed 89*h* may be made to take place in timed relation and in unison with a like sliding movement of heat sealing means for package closure seam C of machine portion A, said carrier 89*a* being interconnected with said heat sealing means carriage through said horizontally disposed bar K1 shown in Fig. 1.

As shown in Figs. 14, 15, and 20, each swingably mounted lever stradling gripper 88 is made to cooperate with the piercing operation of each of said needles 87 to shorten string-handle H in forming non-tangling loop L. As grippers 88 are spaced apart to correspond to the spacing of said needles 87, and must swing in unison, they may be interconnected by pivotal bar 88*d*. Another rock arm 88*e* arranged in angular relation to turn with rock arm 88*b* is pivotally shackled, as at 88*f* to one end of an adjustable raw bar 88*g*. The other end of latter may also terminate in a pivoting shackle 88*h* and arrange for permitting universal swinging movement of draw bar 88*g*. Said shackle 88*h* may also be connected through suitable timed power transmission means, such as cam follower 88*j* having roller 88*k* riding in cam groove 88*m* of plate cam 88*n* which is mounted to turn with main power drive shaft 51. Cam 88*n* and follower 88*j* when operating, swing grippers 88 in unison in and out of effective position shown in Figs. 20 and 21. Cam follower 88 may form one arm of a bell crank 88*p*, the other arm 88*r* thereof being adjustably pivoted for varying the swing of said grippers 88 and connecting with shackle 88*h*. Bell crank 88*p* may be mounted to rock on shaft 88*s* which may be supported by an extension bracket 88*t* bolted to apparatus frame F as shown in Fig. 14.

In order to more positively prevent the moving packages B from being torn or the slits N1 from being irregularly formed or misshapened during string-handle shortening operation above described in the projection and retraction of needles 87, a reinforcing plate shield 84 may be provided to be intermittently positioned over the mid-section of each package B wherethrough string-handle H is looped as seen from Figs. 14, 15, and 23. Plate shield 84 may be firmly screw attached to terminate free swing side 84*a* of double arm fitting 84*b*, the other or pivoted side 84*c* of the latter being trunnioned between spaced apart bearing blocks 84*d* which may form part of a plate member 84*e* firmly bolted on an adjustable mounting 84*f* of machine frame F.

To actuate plate shield 84 in proper timed relation, said pivoted side 84*c* may be provided to have upstanding therefrom lever arm 84*g*, the end of which swingable connects with a pivoting shackle 84*h* that terminates length-adjustable draw bar 84*j*. The other end of the latter may also terminate in a pivoting shackle 84*k* and arrange for permitting universal swinging movement of draw bar 84*j*. Said shackle 84*k* may also be connected through suitable power transmission means, such as, roller terminated cam follower 84*m* motivated by plate cam 84*n* mounted to turn with main duplicate power drive 51 adjacent to plate cam 88*n* as shown in Figs. 14 and 15. Cam follower 84*m* may form one arm of a bell crank 84*p*, the other arm 84*r* thereof having adjustably pivoted connection 84*s* with said shackle 84*k*.

The movement of follower 84*m* by cam 84*n* swing plate shield 84 in and out of effective operating positions in timed relation to the shortening of string-handle H, the effective operating position being shown in Figs. 20 and 23, and ineffective position is shown in Figs. 14 and 15. Plate shield 84, as shown in Fig. 23 may be formed with shaped extension portions 84*t* which provide clearance for the passage of needles 87 through each package mid-portion.

Disengagement of the loops L from needles 87 just before the string-handle H shortening operation is finished when said needles 87 are in full retracted position may be accomplished, as is clear from Figs. 14, 15, 26, 27, and 28 by providing a flagging member or loop side-pusher 85*a* and loop depresser 85*b* co-operating with each needle 87, both being constructed and arranged to be actuated in proper timed relation in said shortening operation.

Loop side-pusher 85*a* may each be formed with a curved side wall 85*d*, may be normally made to extend in height above and below the level of the path of movement of needles 87 when the latter are fully retracted. Said side-pushers 85*a*, each being swingably mounted to extend from an arm lever 85*c*, having a wire extension 85*e* and pivoted on plate mounting 85*f*. The latter may be secured to move with said bearing carrier 89*a*. Side-pusher 85*a* being caused to swing in timed relation in front of needles 87 when the latter are fully retracted, and to clear the paths of movement of said needles 87 when the latter are being projected, as seen from Figs. 14, 15, and 17.

Said timed movement of loop side pushers 85*a* are partially effected in unison movement thereof by providing stretcher bar 85*g* pivotally interconnecting said spaced arm levers 85*e*, one of the latter having an angularly disposed and upright extension 85*h* for applying swing power drive thereto as is clear from Fig. 17.

Arm lever extension 85*h* may connect with pivoting shackle 85*j* terminating one end of an adjustable connecting rod 85*k*, the other end of the latter being connected to suitable timing power transmission means, such as, a roller terminated cam follower 85*m* actuated by plate cam 85*n* to turn with power-drive 51*a* mounted adjacent said plate cam 89*k* as shown in Figs. 14 and 15. Cam follower 85*m* may form one arm of a bell crank, the other arm 85*p* thereof being pivotally connected at 85*q* with shackle 85*r* which terminates said other end of said connecting rod 85*k*. Said bell crank cam follower arm 85*m* and cam 85*n* may be mounted on said rock shaft 89*r* supported by said bracket 89*s*.

Loop depresser 85*b* may be formed with a vertically disposed spade-blade 85*s* which is movably mounted to extend at a spaced distance from a portion of the path of travel of package closure seam C, along the shortener device 80 for a distance slightly more than the combined spacing of the needles 87, as shown in Figs. 14 and 15. Said spade-blade 85*s* may be trunnioned on twin arms 85*t* between spaced bearings 85*u* mounted on carrier 89*a*, one of said arms 85*t* having an upstanding extension 85*v* which connects with pivoting shackle 85*w* terminating one end of an adjustable connecting rod 85*x*. The other end of the latter may terminate in a pivoting shackle 85*y* which connects at 85*z* with said other bell crank arm 85*p* just above said pivotal connection 85*q*.

Thus, disengagement of loops L from needles 87 will take place in timed relation with needles 87 on movement of the loop side-pushers 85*a* from the position shown in Fig. 20 to just before the position shown in Fig. 26, and after string-handle loops L are formed on being released from needles 87, they are thereafter depressed into non-tangling position to lie flat against the rear sides of packages B1 by down swinging of depresser blade 85*b*, as is clear from Figs. 25, 26, and 27. Both loop depresser blade 85*b* and said slide-pushers 85*a* are then moved away from the path of movement of the needles 87 in timed relation and completely finished packages B1 each with shortened string-handles H and tag T positioned against the front side of package B1 continue to constantly advance without dwells in an uninterrupted edge to edge series sequence through apparatus unit U and pass from said string-handle shortener and non-tangling device 80 to the counter group delivery selector 90, as shown in Fig. 1.

As chain belt Y with pincer jaws G continues to advance, said packages B1 individually and in consecutive series on leaving string-handle shortener-non-tangling device 80 and proceeding through the count group delivery selector 90 without interruption pass under a plurality of spaced apart releasably controlled grab-clutching means 91, the latter forming a portion of said selector 90 mounted over the path of movement of said packages B1, each of said means 91 being mounted on plug piece 92*a* for vertical reciprocation with lower end of a plunger tube 92. Said clutching means 91 and tubes 92 are disposed in parallel alignment so that said clutching means 91, as here shown, may pick up as a single group four packages B1 of the continuously advancing edge to edge sequence series when the latter are released by pincer jaws G and on being seized by said clutching means 91, as seen from Figs. 30, 34 and 34*a*.

The release movement of said pincer jaws G takes place along rails R of conveyor Y at a distance short of conveyor chain belt head sprocket 90*a* thereof which turns with a short shaft 90*b* journalled in bearings 90*c* supported from bolted extension frame portion 90*d*, along the path of travel thereof under said grab-clutching means 91. Said release movement may be accomplished by providing a depressable levelling section R1 for each rail R on which rollers D ride to control the effective operations from closed to opening of grippers G about packages B1. Said rail sections R1 may each be lowered, that is, displaced from a normal level at which grippers G retain packages B1 on conveyor belt Y as shown in Fig. 34 by a vertically disposed thrust pin 196 carried thereby to extend down therefrom through each rail R to terminate in a headed end 196*a* at a spaced distance below rail R. A helically wound spring 196*b* may be interposed between said headed end 196*a* and underside of each rail R so arranged that said springs 196*b* may be permitted to exert pressure to bring rail sections R1 down from said normal level position a sufficient distance to cause grippers G riding thereon to open and release packages B1 to be picked up by grab clutching means 91, as shown in Fig. 34*a*.

Lowering action of rail sections R1 through pressure exerted by spring 196*b* may be controlled in timed relation in any suitable manner and as here shown, there is provided flattened circular disc cams 196*c* on which undersides of said pin headed ends 196*a* ride. Said disc cams 196*c* are mounted on rock shafts 196*d* to oscillate each from effective round circular portion thereof, when rail sections R1 are raised to retain grippers G closed about packages B1 against the action of springs 196*b*, to an effective flattened portion of said disc cam 196*c* when rail sections R1 are lowered by pressure exerted by springs 196*b* to open grippers G for releasing packages B1. Said oscillation may be accomplished by lever arms 196*t* which carry said disc cams 196*c* to swing on rock shafts 196*d* through a suitable power drive transmission, such as horizontal bar 196*e* pivotally interconnecting with ends of lever arms 196*t* to operate said disc cams 196*c* in unison. A length adjustable thrust rod 196*f* which is secured to extend from an end of said bar 196*e* terminates in a shackled connection 196*g* for pivoting on an end of an arm lever 196*h* upwardly extending from a rocking or hub sleeve 196*j*, the latter also having another upwardly extending cam follower lever 196*k* which carries a roller 196*m* driven by plate cam 196*n* mounted to turn with power drive shaft 51*a*. Said hub sleeve 196*j* may rock on horizontal short shaft 196*p* which is journalled from depending bracket 196*q* and an upstanding bracket 196*r*, each being bolted to rigid portions of frame F, as shown in Figs. 34 and 35.

Grab-clutching means 91 may be constructed and operated in any suitable manner, and as here shown, each comprises a pair of fingers or tongs 91*a*, each tong being pivoted at 91*b* to plunger tube plug piece 92*a*, and provided with cooperating linkages 91*c* extending into plunger tube 92 through slots 92*b* thereof and pivoted to sliding block 91*d*. The latter normally is resiliently supported in a raised or elevated position within tube 92 by compression spring 91*e* seated on said end plug piece 92*a*. Sliding block 91*d* has an elongated spindle 91*f* secured to extend upwardly therefrom within tube 92 and a pressure receiving end 91*g* of said spindle 91*f* opposite the end thereof secured to said block 91*d* passes through a guide washer 92*c* fitted within upper tube end 92*d* so that pressure can be exerted down on spindle end 91*g* by an end 91*j* of a trigger lever 91*h* for causing said tongs 91*a* to spread open against the action of spring 91*e* which normally urges the tongs 91*a* to snap shut as is clear from Figs. 33 and 33*a*. Lever 91*h* may be pivoted at 91*k* to extend through a hollow fitting 92*e* which is firmly secured to cap upper end of tube 92 and to enclose said spindle end 91*g* and trigger 91*j*.

Spaced apart plunger tubes 92 constructed with clutching means 91 assembled as above described, may be mounted for horizontal movement together with carriage 93 whch rides on a pair of spaced apart parallelly aligned track bars 93*a*, over the path of movement of said packages B1 and also for vertical sliding movements with respect to said carriage 93 so that, as is clear from Figs. 30 and 31, tongs 91*a* slide in unison to reach down and seize the group of four leading packages B1 released from grippers G just before said group of packages B1 reach the end of the run side of conveyor Y over the head drive sprocket thereof while moving along in proper timed relation. Track bars 93*a* may be rigidly supported by upright stanchions F1 on machine frame F. Downreach movement of said tongs 91*a* may be accomplished by connecting each of said tube cap fittings 92*e* through pivot 92*f* with a shackle 92*g* which terminates one or lower end of an adjustable draw rod 92*h*. The other or upper end of the latter may each be provided with a strap shackle 92*j* swingably suspended from a bar 92*k* carried by a double ended horizontally disposed boom lever 92*m*, which has end 92*n* opposite said bar 92*k*, mounted for rocking on another horizontally extending bar 92*p*, that is supported on an elevated portion F2 of said stanchion F1.

Said boom lever 92*m* has pivotally connected thereto at 92*q* an upper end of a vertically downextending length adjustable reach rod 92*r*, a lower end of which connects at 92*v* with a mid portion of a roller terminated lever cam follower 92*s* which has an end opposite the roller end pivoted at 92*t* to apparatus frame F, said follower 92*s* being driven by plate cam 92*u* mounted to turn with power drive shaft 51*a*. The latter through rotation of plate cam 92*u* raises and lowers reach rod 92*r* to rock boom lever 92*m* which in turn through the above described connections with plunger tubes 92 slidingly lower tongs 91*a* into a position level for seizing said group of advancing packages B1 and raise same, as required and as is clear from Fig. 30.

As is clear from Figs. 31, 33, 33*a*, and 46 to open and close tongs 91*a* for seizing and clutching packages B1 before reaching and at said lowered position of said tongs 91*a*, trigger lever ends 91*m* opposite pressure ends 91*j* are lifted by applying an actuating force and releasing same in proper timed relation with the raising and lowering action of tongs 91*a* described above. Said lifting actuating forces each may be applied through a universal pivoting shackle 91*n* terminating lower end of an angularly extending draw rod 91*p*, upper ends of the latter each having a strap shackle 91*q* swingably suspended from a bar 91*r* carried by a double ended horizontally disposed boom lever 91*s*, which has an end 91*t* opposite bar end 91*r* thereof mounted for rocking on a horizontally extending bar 91*u* which is supported on stanchions portion F2 below said bar 92*p*, poom lever 91*s* having pivoted thereto at 91*v* an upper end of a vertically extending length-adjustable reach rod 91*w*, a lower end of which connects at 91*z* in a mid portion of a roller terminated lever cam follower 91*o* driven by a plate cam 91*l*, the latter being mounted to turn with said drive shaft 51*a*, as shown in Fig. 30.

For horizontally reciprocating carriage 93 with plunger tubes 92 on track bars 93*a* to advance in proper timed relation with each of said groups of packages B1 during the pickup operation of said grab-clutching means 91, there may be provided, as shown in Fig. 31, a projecting plate 93*b* extending from carriage 93 to which is pivoted as at 93*c*, shackle 93*d*, the latter terminating a length-adjustable draw bar 93*e* which has an opposite end also provided with another shackle 93*f*. The latter pivotally connects as at 93*g* with one end 93*h* of a vertically disposed swinging lever 93*j* having a mid portion mounted for rocking movement as at 93*k*, the latter being supported on bracket 93*n* horizontally extending from frame F1. The other end 93*q* of said lever 93*j* serves as a cam follower and terminates in a roller 93*r* which rides to and fro in a groove 93*s* of a cylinder cam 93*t*, the latter being mounted to turn with said shaft 51*a*, as is clear from Figs. 31 and 35.

After said group of packages B1 have been picked up and fully raised with the elevating movement of tongs 91*a*, over and clearing the path of advancing of said packages B1 on conveyor belt Y, said group of four are deposited on a horizontally disposed plate platform 94 which is slidingly interposed at an effective level along the path of travel of a series of stall structures 95, mounted on an endless conveyor belt 95*a*, as shown in Figs. 29, 30, 36, 36*b*, 36*a*, 37, 44, and 46. As there shown, four of said stall structures 95 are in loading position, one to service each of said grab-clutching means 91.

Said platform 94 may be mounted for sliding movement on a supported carrier base 94*d*, in a direction toward and away from the plane of alignment of said tongs 91*a*, said carrier base 94*d* being supported by an overhanging shelf bracket 94*e* rigidly carried by a vertically extending supporting spacing member 94*f* bolted to one of said rails R.

Sliding movement of said platform 94 takes place in timed relation to the hoisting movement of packages B1 from the gripper G on conveyor belt Y, that is, with forward and rearward movement in a relatively transverse direction with respect to lifting of the packages B1 from the grippers G to the platform 94. Such movement may be accomplished in any suitable manner, and as here shown, is provided by having downwardly projecting from said platform 94 spaced apart pins 94*c* engaged in guide slots 94*j* provided in said carrier base 94*d*, the latter being supported to reciprocate in parallel relation to said advancing movement of packages B1 on conveyor belt Y on said bracket 94*e* under platform 94, said slots 94*j* being positioned in angular relation to the movement of said carrier base 94*d* as is clear from Figs. 36*a*, 36*b*, and 37.

Carrier base 94*d* may have the required reciprocating movement provided by extending one end 94*k* thereof, and pivotally connecting to the latter with a shackle 94*m* terminating one end of a push rod 94*n*. Another shackle 94*p* terminates the other end of said rod 94*n* which connects with one arm of a bell crank 94*g*. As seen from Figs. 41, 42 and 43, bell crank 94*q* is pivotally carried on an upstanding support from a portion of frame F, and the other arm thereof through a shackle 94*r* connects with an end of a cam follower 94*s* which is pivotally mounted at 94*t* to a portion of frame F. Cam follower 94*s* carries a roller 94*v* which is actuated by plate cam 94*u* mounted to turn with drive shaft 51.

Said carrier base 94*d* may be made with upstanding parallelly aligned partitions 94*g* extending up a distance of just short of the height of a package B1, and are spaced apart a distance slightly greater than the width of a package B1, said partitions 94*g* forming passageway 94*a* therebetween for receiving in proper timed relation packages B1 from the elevated suspending positions reached by tongs 91*a* as is clear from Fig. 46.

Inner facing walls of said partitions 94*g* may be formed with horizontally extending saw-tooth shaped corresponding projections 94*h* positioned a distance of about one-half the height of a package B1 from platform 94 and may be so constructed and arranged to register said passageways 94*a* to correspond to the alignment with packages B1 suspending from tongs 91*a* when the latter are fully elevated. Said saw-tooth projections 94*h* of each partition 94*g* serve to retain packages B1 received therebetween, in erect flat surface abutment relation in which relation the latter continue during advancement thereof through count group delivery selector 90 for cartoning and as shown in Figs. 46 and 46*a*, groups of packages B1 are made to pass from platform passageways 94*a* into stall structures 95 which align with said platform passageways 91*a*.

In order that the packages B1 be positively projected into passageway 94*a* in upstanding, that is erect positions, each platform 94 may be provided at inner opposite corners thereof with upright short sides 94*o* which support spaced apart cooperatively positioned chocks 94*l* extending just below the level of saw-tooth projections 94*h*. Said chocks 94*l* serve to clampingly engage and retain opposite edges of each package B1 just before and while being projected onto the extended platform 94 and between saw-tooth projections 94*h* of passageway partitions by a horizontally stroked pusher head 96, as is clear from Fig. 46.

Stall structures 95 may each have a floor plate 95*b*, carried by endless conveyor chain belt 95*a* and when effectively positioned moves in substantially the same horizontal level as platform 94, said floor plate 95*b* having individual side walls 95*c* upstanding therefrom, the latter being spaced apart substantially the same distance as said platform partitions 94*g*. Front and rear facing sides of said stall structures 95 may be made open-ended for registering in alignment with platform passageway 94*a*, and to permit through movement of packages B1 when unloading for counted delivery thereof through a chute 98 in the manner hereinafter described. A stationary front guiding barrier wall 95*d* may be provided to extend along the path of movement of said stall structures 95 a sufficient distance to prevent movement of said packages B1 through stall structure 95 while aligning with platform passageway 94*a*, as shown in Figs. 44, 46, and 46*a*.

Inner facing surfaces of stall structures side walls 95*c* may be provided with co-operatively projecting slide rails 95*h* horizontally extending at a distance about one-half the height of a package B1, and positioned in spaced alignment with said saw-tooth projections 94*h* for engaging opposite mid-portion edges of the packages B1 passed into said stall structures 95 from passageways 94*a*. Slide rails 95*h* may each be formed with a saw-tooth shaped end 95*j* adjacent to and in alignment with partitions saw-tooth projections 94*h*, and floor plates 95*b* may have chocks 95*k* upstanding therefrom for releasibly retaining bottom edge portions of packages B1 to prevent the latter from being accidentally displaced during regrouping operation of packages B1, when loaded into stall structures 95, as shown in Figs. 46 and 46*a*.

As further means to prevent said displacement, tag T may be retained against the flat side of each leading package B1 in each stall structure 95 and said stationary front wall 95*d* may have a rear facing horizontally extending slide rail 95*m*, in spaced alignment with said slide rails 95*h* as is clear from Figs. 36, 44, and 46.

Endless conveyor belt 95*a* which is positioned to pass said stall structure floor plates 95*b* carried thereon in close proximity to ends of platform passageway 94*a*, has a head sprocket 95*e* mounted to turn with a drive shaft 95*f*, and a tail sprocket 95*g* as shown in Fig. 36 spaced from said head sprocket 95*c*, said tail sprocket 95*g* being suitably mounted in adjustable bearings supported on frame block F3 upstanding on frame F.

Five of the closely spaced level stall structures 95 when forming an upfacing or run side of said conveyor belt 95*a* are all arranged to be used at one time to effect the regrouping operation of packages B1 being produced, as is clear from Figs. 36 and 44. Floor plates 95*b* of said five stall structures 95 may be supported from the under side of the moving border edges thereof by track strip 95*n* bolted to said support 94*f* and by a rearwardly extending ledge 95*p* projecting from lower edge of said front wall 95*d*, as shown in Figs. 46 and 46*a*.

After each package B1 of said group is hoisted to an upper level of platform 94 by tongs 91*a* from the lower level shown in Fig. 30, on being released by grippers G, platform 94 meanwhile has been moved out in timed relation as has been described above to extend to the raised packages B1, and there the latter are raised slightly and then released by tongs 91*a* to land on the platform 94 by being subjected to the horizontal sliding movement of stroked pusher heads 96 thereon into registering aligned passageways 94*a* between partitions 94*g* and against swingably mounted retractable back stop plates 97 which with said partition saw-tooth projections 94*h* retain the packages B1 in erect upright positions, as is clear from Fig. 46.

Packages B1, one from each group of successive four groups carried by conveyor belt Y are simultaneously hoisted, landed and subjected to sliding movement into each of the passageways 94*a* by said pusher heads 96 and for each package B1 projected into a passageway 94*a*, the aligning back stop plate 97 recedes, that is, moves in a forward direction, a distance equal to the thickness of the package B1 while and until a group of four packages B1 are segregated in each passageway 94*a*. Then said stop plates 97 are swung above the path of movement of said packages B1 being projected by pusher heads 96 and the latter are stroked a further distance to project the last mentioned group of packages B1 into stall structures 95 registering alignment with passageways 94*a*.

As shown in Figs. 29 and 30, stroking of pusher heads 96 in unison and in the required proper timed relation can be accomplished by providing each head 96 with a pair of horizontally disposed, vertically spaced apart elongated draw bars 96*a* having on front ends thereof pusher head 96 which is aligned to move forward into stall structures 95, and be retracted rearward beyond the hoisting path of movement of packages B1 as is clear from Fig. 30. Said bars 96*a* are mounted by mid-portions thereof for sliding movement on a quadruple double-branched bearing mounting 96*b* that is rigidly secured to a portion of frame F by spaced bolts 96*c*. Ends of said bars 96*a* opposite the pusher head 96 may be secured by a clamping strap 96*d* which through linkage 96*e* pivots as at 96*f* with end of an arm 96*g*, the latter extending upwardly from a sleeve bearing 96*h* that rocks on horizontally disposed shaft 96*p*, there being provided a tension spring 96*n* having the opposite ends thereof anchored to extend said spring 96*n* from rail R to said arm 96*g* for constantly urging the latter to exert stroking pressure to pusher head 96. Sleeve bearing 96*h* also carries a roller terminated cam follower 96*k* that rides on plate cam 96*m* mounted to turn with a power drive shaft 51*c*, as is clear from Figs. 29 and 30.

Plate cam 96*m* which may be of any well understood construction, as for example, as shown in Fig. 30*a*, is designed to operate for transmitting successive movements and as here used for stroking pusher heads 96 is subjected to a first movement when platforms 94 are empty for unloading each package B1 of the first group of four held in raised position by tongs 91*a* onto said platforms 94 and against back stop plates 97 which are positioned to extend rearwardly a distance to allow accommodation of a single upstanding package B1 in each passageway 94*a* and for engaging the extreme rearwardly positioned set of saw-toothed projections 94*h*.

Second and third successive stroking movements given to each plunger head 96 by the operation of said cam 96*m*, unloads a package B1 of the next two successive groups from tongs 91*a* onto said platform 94, each movement also having a forward stroking travel of a distance equivalent to the thickness of a package B1 like said first movement for slidingly projecting the leading packages B1 of the aforementioned first group forwardly against back stop plates 97 which concurrently move forwardly said equivalent distance of the thickness of a package B1 after each second and third stroking movement, said stop plates 97 being actuataed by a suitable cam 97*z*, as for example, as shown in Fig. 30*b*, which transmits the various different movements thereto as required.

Fourth successive stroking movements given each plunger head 96 by the operation of said cam 96*m* for unloading each package B1 from a fourth group, onto platform 94, are each of an increased forward travel, that is, a relatively much longer movement being of sufficient distance for completely transferring the four packages B1 forming a face to face abutment group in passageway 94*a* into an aligning stall structure 95 with each of the stop plates 97 swinging up out of the path of said transfer, as is clear from Figs. 30 and 46.

The positions of the packages B1 on platform 94, after the second of the operational stroking movements and just prior to the third movement transmitted through said cam 96*m* to the plunger heads 96 and through cam 97*z* to the back stop plates 97, are as shown in Figs. 44 and 46, and in Fig. 46*a*, the positions of a group of said packages B1 in stall structure 95 are shown just after being transferred by the fourth of said operational movements.

Swinging movements of the back stop plate 97 and said retracting or forward movement thereof may be made to take place by mounting each of said stop plates 97 on a swing arm 97*a* which secures at one end thereof the stop plate 97 vertically disposed when effectively operating, as shown in Figs. 44 and 46. The other ends of said swing arm 97*a* may each be pivoted as at 97*b* on a cross-head 97*c* for reciprocation with a horizontally disposed drive rod 97*d*, the latter being mounted on a quadruple double branched bearing mounting 97*e* that is rigidly secured to a portion of frame F by spaced bolts 97*o*. A suitable leaf spring 97*f* may be screw fastened to said cross-head 97*c* for normally urging said arm 97*a* into said effectively swung position. To keep cross-head 97*c* and drive rod 97*d* riding in a relatively straight line without rotation there is provided a guiding rod 97*g* fixedly carried by said bearing mounting 97*e* in horizontally disposed parallel spaced relation to each of the drive rods 97*d* along which guiding rod 97*g*, said cross-head 97*c* slides. Said swing arms 97*a* each may have a mid-portion down-facing camming edge 97*h* serving as a mono-rail along which a grooved wheel 97*j* rides. Wheels 97*j* are carried to turn on a horizontal cradling bar 97*q* supported on an upwardly extending branch end 97*m* of spaced apart twin-ended plate lever 97*k*, the other or downwardly extending branch end 97*n* of said plate lever 97*k* being pivoted as at 97*p* with a one or upper end of a downwardly extending length-adjustable connecting rod 97*l*. Said plate levers 97*k* on the ends thereof opposite the branch end 97*m* each have a pivotal support 97*r* on mounting 97*e* whereby said arms 97*a* may be caused to swing in unison to and from a lower level with stop plates 97 in effective positions as shown in Fig. 46 and to and from an elevated position with stop plates 97 above the packages B1 during regrouping thereof for count delivery as shown in Fig. 46*a*.

Connecting rods 97*l*, as shown in Fig. 30, each have the other or lower end pivotally connected to terminate a roller carrying cam follower 97*s* which rocks on a shaft 97*t* supported on a lower portion of frame F, said cam follower 97*s* being driven by a cam plate 97*y* mounted to turn with a power drive 51*d* for raising and lowering swing arms 97*a* in proper timed relation. Said shaft 97*t* may also support for rocking movement thereon another roller carrying cam follower 97*u*, the latter having upwardly extending therefrom a lever arm 97*v* which pivotally connects with a horizontally disposed cradling bar 97*w*. Through pivotally ended links 97*x*, said cradling bar 97*w* connects with each of said crossheads 97*c*, said cam follower 97*u* being driven by said plate cam 97*z* mounted to turn with said power drive 51*d* for successively moving said back stop plates 97 in proper timed relation, in cooperation with the successive movements of plunger heads 96 as herein before described, said plate cam 97*z* being constructed to transmit the various successively required movements by said backing plates 97, as is clear from Figs. 30 and 30*b*.

In loading each stall structure 95 carried by conveyor belt 95*a* with packages B1 projected from each platform passageways 94*a*, on bringing said stall structures 95 into registering alignment with said passageways 94*a*, suitable properly timed driving means are provided which, as shown in Figs. 36, 38, and 39, include besides said conveyor belt head sprocket shaft 95*f*, spaced apart bearings 95*q* for said shaft 95*f*, the latter forming part of an inverted double hanger 95*r* which is rigidly bolted to beam member 95*s* spanning portions of frame F. An overhanging end of said shaft 95*f* has said head sprocket 95*e* mounted to turn therewith and mounted on a mid-portion of said shaft 95*f* between bearings 94*q* there may also be provided a ratchet wheel 95*t* secured to rotate with said shaft 95*f*. A lever 95*u* having a collared end is also supported on said shaft 95*f* adjacent the ratchet wheel 95*t*, and a free end of said lever 95*u* is connected to a roller carrying cam follower 95*w* through a pivoting shackled ended connecting rod 95*x*. Said cam follower 95*w* may be pivotally mounted at 95*y* to a portion of frame F under spanning beam 95*s*, and is driven by a plate cam 95*z* mounted to turn with power drive 51.

To prevent conveyor belt 95*a* from reverse turning movement and to assure a steady even advancing movement from the power transmission above described through cam plate 95*z*, ratchet wheel 95*t* and cross shaft 95*f*, there may be provided a suitable drag means of any well known construction, denoted generally at 95*l*, and shown in Figs. 38 and 40, as being mounted on another overhanging end of cross shaft 95*f*, opposite to head sprocket 95*e*, said drag means 95*l* comprising a spring tensioned strap frictionally engaging peripheral surface of a wheel mounted to turn with said shaft 95*f* serving in the well understood manner.

As so far described, completely manufactured individual packages B1 which have been constantly advanced by grippers G with conveyor belt Y in a continuous line series upright or erect arrangement substantially in edge to edge relation sequence on passing to the selector count delivery 90 are sub-divided and grouped first by removal of said packages B1 from said line edge to edge series arrangement on conveyor belt Y into consecutive groups of four packages B1, the latter of each group having been simultaneously hoisted and projected into each of said platform passageways 94*a* until four groups of four packages B1 fill said passageways 94*a*. The group of four of said packages B1 in each passageway 94*a* now instead of being in said edge to edge line series sequence are in flat side abutment erect arrangement with a flat side of each package B1 of each group contacting an adjacently positioned package B1, said group of flat side abutment arrangement of packages B1 having been loaded into four stall structures 95 carried by conveyor belt 95*a* from passageways 94*a* as aforedescribed.

Reassembling said package groups for delivery into a predetermined or counted number for cartoning is carried out from a delivery chute 98, which is provided to extend in spaced parallel relation to platform passageways 94*a*, and is located to receive each loaded group of packages B1 in turn from one of the filled stall structure 95 when the latter moves into registered alignment with chute 98, as is clear from Figs. 29 and 44.

Since said stall structures 95 are open ended, each of the latter carrying a group of four packages B1 as it passes beyond the barrier wall 95*d* and comes into registered alignment with said chute 98 has said group of packages B1 projected into chute 98 by a pusher 99. Said chute 98 may be formed with spaced apart side walls 98*a* upstanding from a slide floor 98*b*, inner facing surfaces of said side walls 98*a*, like those of partitions 94*g*, being provided with horizontally extending saw-tooth shaped projections 98*c* positioned a distance of about one-half the height of a package B1 from said slide floor 98*b*. Said projections 98*c* serve to retain packages B1, passing into chute 98 in erect flat surface abutment grouped relation during almost the entire travel of said packages B1 through the chute 98.

Apparatus unit U herein described is designed to deliver at a predetermined count, sixteen packages B1 which is a multiple of said segregated groups of four and which count is regarded at present as a desirable count for trade requirement in cartoning sixteen and forty-eight packages B1 when the latter are tea-balls.

For the above stated purposes, chute 98 may be made long enough to accommodate about thirty packages B1 along saw-tooth projections 98*c* and about four additional packages B1 at the discharge end portion 98*d* of said chute 98 beyond said projections 98*c*, as shown in Fig. 44.

Pusher head 99 may be made like said pusher head 96 and is mounted to reciprocate in parallel spaced relation to the latter from one end 99*a* of an elongated horizontally disposed rod 99*b* which slides through spaced apart end journalling portion 99*c* of a rigidly fastened saddle-bearing block 99*d*. Through a collar 99*e* secured to move with a mid portion of said rod 99*b*, and a connecting bar 99*f* swingably mounted between said collar 99*e* and an offset end 99*g* of a rock arm 99*h*, connected at 99*j* with a sleeve shaft 99*k* mounted on said shaft 96*p*. A horizontally extending roller termined cam follower 99*m* is also carried to extend from said sleeve shaft 99*k*, said cam follower 99*m* being actuated by said double faced plate cam 98*r* mounted to turn with drive shaft 51*c*, as shown in Figs. 29 and 35. Pusher head 99 is reciprocated in timed relation with the movements of said pusher heads 96 and acts to unload each stall structure 95 aligning with chute 98 by projecting the group of four packages B1 carried by successive stall structures 95 into said chute 98 to form a single lot of four groups in said predetermined count, as is clear from Figs. 29 and 44.

As packages B1 are transferred into chute 98 they are thus automatically delivered for cartoning of said predetermined count, and as here shown, arranged in group lots of sixteen for insertion from the discharge chute end 98*d* into individual boxes (not shown) in the well understood manner.

Said predetermined count delivery is automatically provided, as shown in Figs. 29 and 44, by having a slideway 98*e* formed with longitudinally extending grooves 98*f* positioned to extend along one of the upright chute side walls 98*a* which, as seen in Fig. 45, may be made integral with slide floor 98*b* of chute 98. Said grooves 98*f* serve as tracks between which a sliding rack 98*g* having edge gear-cut teeth 98*h* is mounted for moving rack 98*g* in a path in parallel relation to the movement of packages B1 along chute 98. Said rack 98*g* may be about one-half the length of the slideway 98*e*, and has said edge teeth 98*h* meshing with teeth terminating one end of a segment of gear 98*j*. The latter may be pivotally mounted, as at 98*k*, and has an arm extension portion 98*m* beyond said pivot 98*k*. Said arm portion 98*m* through a pivotally shackle ended rod 98*n* connects with an upwardly extending arm 98*p* of a bell crank mounted to rock at 98*u* and also having a downwardly sloping roller terminated cam follower 98*q*, which is driven by a groove carrying double faced cam plate 98*r*, the latter being mounted to turn on counter shaft 51*c* at reduced speed through a set of meshing gears 98*t* from power drive 51*a*, as shown in Fig. 32.

Bolted adjacent the inner end portion of said rack 98*g* is a block 99*p* which supports a package count advancing gate 99*q* mounted thereon for sliding to engage and advance said packages B1 during movement of said rack 98*g* from an inlet end of chute 98 to about the middle of the latter when said gate 99*q* is extended into chute 98 through a slotted opening 98*v* provided in adjoining side wall 98*a* of said chute 98. Said block 99*p* also supports said gate 99*q* for retraction to clear said chute 98 during return movement of rear end of said rack 98*g* toward said chute inlet, as is clear from Figs. 29, 44 and 45.

To slide said gate 99*q* in proper required timed relation and with respect to the reciprocation of rack 98*g*, there may be provided a suitable power transmission means. As shown in Figs. 32 and 42, an end of said gate 99*q* extending in a direction away from said chute 98 is connected through a pivoting shackle ended rod 99*r* with an upwardly extending arm 99*s* of a sleeve hub 99*t* which rocks on auxiliary shaft 94*w*, the latter being supported from portion of frame F. A horizontally extending arm 99*v* is also carried by said sleeve 99*t* which connects through another pivoting shackle ended rod 99*w* with a roller carrying cam follower 99*y* driven by a plate cam 99*z* which is mounted to turn with power drive 51*d*, the latter driven through gearing 51*e* from shaft 51.

As is clear from the drawings, main power drives 51, 51*a*, and said other drive shafts 51*b*, 51*c* and 51*d* may form an interconnecting power transmission means for apparatus unit U from a suitable power source such as an electric motor (not shown) in any well understood manner.

Apparatus unit U may also, if desired, be provided with suitable safety guards, denoted generally in various figures of the drawing at 100 and positioned over or enclosing various moving parts thereof in the well understood manner.

Said apparatus unit U constructed as above described and shown with said inspection means control I incorporated in the path of movement of the constantly advancing packages, has been found to provide a self-contained installation that is highly efficient and practical for manufacturing complete tea balls B1 in serving to automatically inspect the latter against imperfection of filling. Each package B1 may be provided with a relatively long non-tangling string-handle H terminated by a tag T, said string-handle H, if desired, being substantially more than twice the length of the package, and being staple-anchored in said over-extending relation to the closure seam C, said tea balls B1 delivered in successively arranged predetermined count for cartoning in novel line assembly mass production at a rated output not heretofore attained.

From the construction and assembly of apparatus unit U as shown in the drawing and as described above, the operation of said apparatus unit U and the improved method of manufacturing packages B1 will be readily understood.

Filter paper sheet material M after forming bag section M1 in passing through machine portion A in providing said inspected, filled, flattened packages P, each having a top closure seam C pass through mechanism 50 which makes the string-handle H, each terminated by a tag T and anchor-staples and end Q of each string-handle H to extend in an over-edge relation with respect to said package closure seam C thereby producing packages B. The latter next pass through string-handle shortener device 80 which pierces through the mid-section of each package B to form a non-tangling loop L against one flat side of the package B and draws the tag T flat against the other side, to provide the individual completed packages B1 which are then transferred to the count group delivery selector 90.

It is to be noted that the operation of apparatus unit U has been found capable to manufacture packages B1 automatically in line assembly fashion while proceeding in constantly advancing movement in an edge to edge line series sequence carried on grippers G of conveyor belt Y without interruption or dwells of any description whatsoever, which otherwise would necessarily be time consuming and reduce the possible maximum output as is attained in practising the invention with apparatus unit U.

Said selector 90 cooperates in a novel manner in the combination forming apparatus unit U as a sub-assembly portion thereof for the production of the improved manufacturing output of packages B1 by rearranging the latter from said line series edge to edge sequence production to provide a predetermined count delivery with a minimum loss of mass production output in making the same available directly for cartoning by merely a simple slide insertion of said count delivery of packages B1 from chute 98*r* into boxes (not shown) as required by the trade in the well understood manner as is clear from Fig. 45.

It is thus seen that in practising the improved method embodying the invention after filled pillow shaped packages P, each formed with flat sides terminating in a top closure seam C, are produced in an edge to edge continuous series sequence while being constantly advanced, and during the operation of forming string-handles H, each terminated by a tag T, that one or more of the following novel steps or combination of steps are provided for, namely: positioning and staple anchoring each string-handle end portion Q in an over-edge extending relation to package closure seam C resulting in making of said package B1 without interruption of the constantly advancing movement thereof; shortening a desired length of the string-handle H by piercing each package B and drawing a mid-portion of the string-handle H therethrough to form a temporary non-tangably positioned loop L thereof to lie flattened against one side of each of said packages B1 being made and to flatten the tag T terminating said string-handle H against the opposite side thereof also in non-tangling relation and in condition for ready full lengthening the string-handle when required by withdrawing said loop L merely by lifting the package B1 by the tag T without otherwise touching the packages B1. Said string-handle shortening step takes place while the packages B1 continue constantly to advance at the same movement rate as said packages P and B; rearranging said packages B1 from said edge to edge continuous series sequence to a plurality of groups of packages B1 each group having predetermined number of said packages B1 positioned in flat side abutment relation; and selecting and forming for delivery said groups into a single assembly of flat side abutting packages B1 to correspond to a desired count for cartoning, said rearrangement and selecting and forming assembly each being carried out at an effective rate corresponding to that of the operational steps in providing said top closure seam C of package P, staple anchoring of string-handle ends Q and loop shortening said string-handles H so that the various steps are carried out concurrently as a single complete mass production manufacture without interruption.

Said steps of rearranging, selecting, and forming for delivery of a desired or predetermined count of packages B1 for cartoning includes the transferring of said packages B1 in the rearrangement thereof into said plurality of groups by constantly advancing in said line series sequence, segregating leading packages B1 in numbers of groups from said line series sequence by placing said moved packages B1 in successive, erect, flat side abutment arrangement to form the individual groups, each group being made up of a number of packages B1 equal to a uniformly divided part of the delivery of said predetermined count which are then combining said individual groups to form the predetermined count while continuing said advancing line series movement and segregation of packages B1 without interruption.

As described above, practical applications of the invention can be utilized in apparatus unit U as a whole, as well as one or more combinations with a machine portion A which operates to fill and seal with top closure seams C individual packages P in constantly advancing in edge to edge line series sequence relation; as for example with mechanism 50 for making string-handle H terminated by a tag T and staple anchoring end portions of said string-handles Q in an over-edge extending relation to said closure seam C to produce said packages B in the continuous constantly advancing series sequence without interruption; and/or with a string-handle shortener non-tangling device 80 to produce complete individual packages B1 in said continuous constant advancing series sequence, and/or with a count group selector 90 for delivering packages B1 in predetermined number for cartoning.

It is to be understood that a simpler apparatus of less productive capacity may be constructed to embody the invention, operating on single packages P instead of four simultaneously, and also that an apparatus unit U of higher capacity output may be operating on more than four packages P simultaneously by incorporating a correspondingly different part for handling means for a multiple of groups of said packages P.

It is thus seen that there is provided an improved method of manufacture, an apparatus unit U and combination of portions thereof in which the objects of the invention are achieved and which are well adapted to meet all conditions of practical use.

As various possible embodiments may be made in the above invention for use for different purposes and as various changes might be made in the embodiments and method above set forth, it is understood that all the above matters here set forth or shown in the accompanying drawing are to be interpreted as illustrative and not in a limiting sense.

Thus having described my invention, I claim as new and desire to secure by Letters Patent:

1. In an apparatus unit of the character described having means for forming filled packages with closure seams and for continuously moving them in a uniformly constant advancing motion along a first path, means for making string-handles each terminated by a tag in consecutive sequence along a path intersecting said first path in timed relation with the rate of said advancing motion of said packages with closure seams along said first path, and a wire stapler for anchoring free ends of said string handles opposite said tags to said closure seams, the combination of transferor means operated in timed relation with said wire stapler for positioning said string-handle ends in over-edge extending relation to the package closure seams prior to applying anchoring staples by said stapler while the filled packages continue in said constant advancing motion passing through the apparatus unit.

2. In an apparatus unit of the character described having means for forming filled packages with closure seams and for continuously moving them in a uniformly constant advancing motion along a first path, means for making string-handles each having a free end portion with a tag terminating the other end in consecutive sequence along a path intersecting said first path in timed relation with the rate of said advancing motion of said packages with closure seams along said first path, and a wire stapler for anchoring said free ends of said string-handles to said closure seams, the combination of transferor means mounted with respect to said wire stapler for operation in timed relation therewith and including releasable gripping jaws swingably mounted for positioning the free string-handle end portion in an over-edge extending relation to closure means of each filled package prior to anchoring said string-handle end portion by the stapler while the filled packages are in said continuous motion through the apparatus unit.

3. In a method of manufacturing filled packages each having a closure seam to which a string-handle and tag is stapled, the steps of forming filled packages each with a lateral closure seam in uniformly constant advancing motion, keeping the packages advancing in said uniform constant motion in series edge to edge abutment relation while positioning ends of the string-handles to said lateral closure seams in over-edge extended relation to the latter, and stapling said string-handle ends in said over-edge extending relation during said uniform constant advancing motion of the packages.

4. In a method of manufacture of the character described, the steps of forming filled packages each with a closure seam in uniformly constant advancing motion along one path, said closure seam extending along an edge of the package parallel to said path of advancement, forming complete individual string-handles each terminated at one end with a tag, extending the other free end of the string-handle in position against each closure seam in an over-edge relation with respect thereto, and stapling said positioned other string-handle end in said over-edge relation to the closure seam while each package is in said constant motion in the last mentioned path.

5. In a method of manufacturing packages with string-handles and tags, the steps of forming along one path, tags from strip sheet material to terminate an end of each string-handle, forming along a second path simultaneously multiple filled packages each with a closure seam while advancing in uniform constant motion, said closure seam extending along an edge of the package parallel to said second path, extending the other end of each string-handle in position in an over-edge relation against a closure seam of each of said multiple filled packages during said constant motion, and stapling said extended ends in said over-edge relation to said closure seams while said packages continue in said constant motion in said first path.

6. An apparatus unit of the character described having means for forming filled packages with closure seams and for continuously moving said packages in uniformly constant advancing motion along one path, means for making string-handles each terminated by a tag in consecutive sequence along a second path, and means for applying an end of each string-handle opposite the tag to a package closure seam while the filled packages are in continuous movement through the apparatus unit, in combination with a string handle shortener mounted along the path of movement of said filled packages in spaced relation to said means for applying string-handles and tags in cooperation therewith, and a power drive for connecting said shortener in timed relation with continuous advancing movement of the filled packages through the apparatus unit.

7. The combination in an apparatus unit of the character described having means for forming filled packages with closure seams and for continuously moving said packages in uniformly constant advancing motion along one path, means for making string-handles each terminated by a tag in consecutive sequence along a second path, and means for applying an end of each string-handle opposite the tag to a package closure seam while the filled packages are in continuous movement through the apparatus unit, in which said means for applying string-handles and tags co-operate with a string-handle shortener spaced from said string-handle and tag applying means, and power means connected to actuate said shortener in timed relation with said string-handle and tag applying means.

8. In an apparatus unit of the character described, means for forming open ended filled packages and for continuously moving said packages in a uniformly constant advancing motion along one path, means for applying closure seams to said open ended packages during said advancing motion, means for making string-handles each terminated by a tag in consecutive sequence along a second path, means for applying an end of each string-handle opposite the tag to a package closure seam while the filled packages are in continuous movement through the apparatus unit, a string-handle shortener spaced from said string-handle applying means, and mounting means for said shortener along the path of movement of said filled packages interconnected with said string-handle applying means for movement in unison therewith.

9. In an apparatus unit of the character described having means for forming filled packages with closure seams and for continously moving them in a uniformly constant advancing motion along a first path, means for making string-handles each terminated by a tag in consecutive sequence along a path intersecting said first path in timed relation with the rate of said advancing motion of said package closure seams along said first path, and a wire stapler for anchoring free ends of said string-handles opposite said tags to said closure seams, in combination with a transferor means portion operated in timed relation with said wire stapler for positioning said string-handle ends in over-edge extending relation to the package closure seams prior to applying anchoring staple by said stapler while the filled packages continue in said constant advancing motion passing through the apparatus unit, and shortener means for looping the string-handles through the packages to non-tangling positions while advancing the filled packages along said first mentioned path.

10. In an apparatus unit of the character described having means for forming filled packages with closure seams and for continuously moving them in a uniformly constant advancing motion along a first path, means for making string-handles each having a free end portion with a tag terminating the other string-handle end in consecutive sequence along a path intersecting said first path in timed relation to the rate of said advancing motion of said packages with closure seams along said first path, a wire stapler for anchoring said free ends of said string-handles to said closure seams, a transferor mounted to operate between said paths and in timed relation with respect to said wire stapler and including releasable gripping jaws swingably mounted for positioning each of the free string-handle end portions in an over-edge extending relation to said closure seam of each filled package prior to anchoring said string-handle end portion by the stapler while the filled packages are in said continuous motion through the apparatus unit, a string-handle shortener spaced from said string-handle and tag making means for looping said string-handle through the packages, and power drive transmission means connected to actuate the shortener in timed relation with said string-handle and tag making means.

11. The combination in an apparatus unit of the character described having means for forming filled packages with closure seams and for continuously moving said packages in uniformly constant advancing motion along one path, means for making string-handles each terminated by a tag in consecutive sequence along a second path, and means for applying an end of each string-handle opposite the tag to a package closure seam in an over-edge relation while the filled packages are in continuous movement through the apparatus unit, in which said means for applying string-handles and tags co-operate with a string-handle shortener spaced from said string-handle and tag applying means, a counter group selector mounted to co-operate with the operation of said string-handle and tag applying means for delivering said apparatus unit output in predetermined numbers of said completely finished filled packages, and power drive transmission means connected to actuate said shortener and selector in timed relation with said string-handle and tag applying means.

12. An an apparatus for manufacturing filled packages, each with a closure seam in a constant uniform sequence, a mechanism for making individual string-handles each having a free end portion and terminated at the other end with a tag, a transferor for releasably gripping and moving said string-handle free end portion into an over-edge stapling position against each package closure, and power-drive means for operating said mechanism and transferor in timed relation with the manufacture of the filled packages in providing a string-handle and tag for each of said packages produced.

13. In an apparatus for manufacturing in a constant uniform sequence filled packages each with a string-handle terminated by a tag, a shortener non-tangle device for through piercing each package in a mid-region thereof and looping a mid-portion of the string-handle therethrough, and power drive means for operating said device in timed relation with said package manufacturing sequence.

14. In an apparatus for manufacturing filled packages, each with a closure seam in a constant uniform sequence, a mechanism for making individual string-handles each having a free end portion and terminated at the other end with a tag, a transferor for releasably gripping and moving said string-handle free end portion into an over-edge stapling position about each package closure, a stapler for permanently anchoring said string-handle free end portions in such over-edge positions, a shortener non-tangling device for through piercing each package to loop a mid-portion of the string-handle therethrough, and power drive means for operating said mechanism, transferor, stapler and shortener device in timing relation with said package manufacturing sequence.

15. In an apparatus for manufacturing in edge to edge relation filled flattened sided packages in a constant uniform sequence, each package having a closure seam and provided with a string-handle looped in non-tangling position terminating in a tag freely suspended against one flattened side of the package, a selector driven in timed relation with said manufacturing sequence for rearranging said packages produced from said edge to edge relation to flattened side abutment relation in predetermined counted groups for delivery to cartons, including means for retaining said tags and said string-handle loops in said non-tangling position during said package rearrangement.

16. In an apparatus for manufacturing filled packages, each with a closure seam in a constant uniform sequence, a mechanism for making individual string-handles each having a free end portion and terminated at the other end with a tag, a transferor for releasably gripping and moving said string-handle free end portion into an over-edge stapling position about each package closure, a stapler for permanently anchoring said string-handle free end portions in such over-edge positions, and a shortener non-tangling device for through piercing each package and looping a mid-portion of the string-handle therethrough, power drive means for operating said mechanism, transferor, stapler and shortener device in timing relation with said package manufacturing sequence, and a selector for rearranging said packages produced from said edge to edge relation to flattened side abutment relation in predetermined counted groups for delivery to cartons.

17. In an apparatus as defined in claim 13, in which said device includes a reciprocatingly mounted needle for engaging a mid-portion of said string-handle to draw said loop beyond one side of said package and for positioning the tag on the opposite side thereto, guide deflector swingably mounted in the path of movement of said needles for disengaging said needle from the drawn loop and for positioning the latter against said first mentioned package side, and means for operating said needle and guide deflector in timed relation.

18. In an apparatus for manufacturing in multiple filled packages, each with a string-handle terminated by a tag, a shortener device comprising a plurality of needles mounted to reciprocate in spaced parallel relation in unison for through-piercing the multiple filled packages being manufactured and for engaging mid-portions of said string-handles to draw a loop beyond one side of each package and to position the tag on the opposite side thereto, guide deflectors swingably mounted in the path of movement of said needles for disengaging each needle from the drawn loops and for positioning the latter against the first mentioned package side, and means for operating said needles and guide deflectors in timed relation.

19. In an apparatus as defined in claim 13, in which said device includes a reciprocatingly mounted needle for engaging a mid-portion of said string-handle to draw said loop beyond one side of said package and for positioning the tag on the opposite side thereto, guide deflector swingably mounted in the path of movement of said needles for disengaging said needle from the drawn loop and for positioning the latter against said first mentioned package side, means for operating said needle and guide deflector in timed relation, and hook member mounted for swinging movement in timed relation to the needle operation to releasably retain mid-portions of the string-handle beyond said string-handle mid-portion engagement by the needle on said package opposite side for guiding formation of said loop during drawing thereof.

20. In an apparatus for manufacturing in multiple filled packages as defined in claim 18, which includes a hook member mounted for swinging movement in timed relation to the operation of each of said needles to releasably retain mid-portions of each string-handle beyond said engagement by each needle on said package opposite sides for guiding the formation of each of said loops during the drawing thereof.

21. In an apparatus unit as defined in claim 1, in which said transferor means includes an edge bracing member swingably mounted in and out of position against the closure seams during the over-edge extension of said string-handle ends prior to said anchor stapling.

22. In an apparatus unit as defined in claim 2, in which said transferor means also includes a pair of lever arms swingably mounted to and from said closure seams in timed relation with movement of said gripping jaws, and an edge bracing member carried by one of said lever arms carried to be positioned against and away from the closure seams during the over-edge extension of said string-handle ends prior to said anchor-stapling.

23. The method of manufacturing filled packages defined in claim 3, including a step of edge bracing said closure seams against being crushed during the step of positioning the ends of the string-handles in said over-extending relation.

24. In an apparatus unit of the character described having means for forming filled flat sided pillow shaped packages with closure seams and for continuously moving them at a uniform constant advancing rate along a first path, means for making string-handles each terminated by a tag in consecutive sequence along a second path intersecting said first path in timed relation with the rate of said packages with closure seams moving along said first path, and a wire stapler for anchoring free ends of said string-handles opposite said tags to said closure seams while moving in said first path at said constant rate, a counted group selector including means for moving successive equal numbers of filled packages from said first path while advancing at said constant rate and rearranging the latter from said line edge to edge series sequence to erect face to face abutment groups in a plurality of third paths, and means for moving said abutment groups into a fourth path in said face to face abutment as successive predetermined package counts for cartoning.

25. In a manufacturing method of filled flat sided pillow shaped packages with closure seams to which string-handles and tags are to be achored, the steps of positioning ends of the string-handles to said closure seams in over-edge extended relation to the latter, and stapling said string-handle ends in said over-edge extended relation during continuous advancement at a uniform constant rate of said filled packages in series edge to edge relation, moving in successive sequence equal numbers of said packages from said line series sequence while advancing at said uniform constant rate to erect face to face abutment groups along a plurality of paths, and then combining said abutment groups into a single file of successive segregated predetermined package count deliveries for cartoning.

26. In a method of manufacturing packages with string-handles and tags, the steps of forming along one path tags from strip sheet material to terminate an end of each string-handle, forming along a second path simultaneously multiple filled flat sided pillow shaped packages each with a closure seam while advancing in uniform constant motion, extending the other end of each string-handle in position in an over-edge relation against a closure seam of each of said multiple filled packages during said constant motion, stapling said extended ends to said closure seams while said packages continue in said constant motion in said first path, moving in successive sequence equal numbers of said packages from said line series sequence to erect face to face abutment groups along a plurality of paths, and then combining said abutment groups into a single file of successive segregated predetermined packages count deliveries for cartoning.

27. In an apparatus unit of the character described, a count selector comprising transferring means for moving filled flat-sided pillow shaped packages from a line series output source production to a plurality of platforms having passageways for uniformly grouping said packages in erect face to face abutment relation assemblies, stall structures mounted for alignment movement along a path passing said platform passageway, pusher-heads for projecting groups of said abutment package assemblies from said passageways into aligning stall structures, a delivery chute mounted along said path for aligning with each stall structure, a pusher-head for projecting each group of said abutment package assemblies from said stall structure into the aligned chute, and a slidegate mounted to sweep into and out of said chute for automatically segregating said groups projected into the chute from said stall structures to provide successive predetermined count deliveries in said erect face to face abutment relation in positions for sliding directly into cartons from the chute.

28. In an apparatus unit of the character described, a count selector as defined in claim 27 in combination with a portion of the apparatus unit for forming packages as said output source production in a constantly advancing movement without interruption, and means for driving said portion and transferring means in timed interrelation in a line production manufacturing fashion.

29. In a method of manufacturing filled packages each having a closure seam to which a string-handle and tag is to be anchored, the steps of keeping the packages continuously advancing in one path in series edge to edge abutment relation while stapling a free end of said string-handle to said closure seams in an over-edge extending relation during said advancement of the packages, shortening the string-handle to non-tangling positions while continuing said filled package advancement in said path, and applying in unison said package closure seams to other packages along the same path at a spaced distance from the string-handle shortening operation.

30. In an apparatus unit of the character described, the combination of means for manufacturing filled packages and means for applying string-handles and tags to each package in uninterrupted continuous advancing series output, a counted group selector means for delivering said apparatus unit output in predetermined numbers of said completely finished filled packages co-acting with said string-handle and tag applying means, a string-handle shortener mounted along the path of movement in spaced relation to said string-handle and tag applying means, and power-drive transmission means connecting said selector and shortener for operation in timed relation with the continuous advancing movement of the filled packages through the apparatus unit.

31. The method of manufacturing packages as defined in claim 5, in which the step of tag forming is carried out in a double path at one-half the rate of the step of package forming.

32. In a package producing and counted group delivery method, the steps of producing filled pillow-shaped packages having flat sides and substantially straight edges with each package having a string-handle and tag in shortened non-tangling position in an upstanding abutment edge to edge relation while continuously advancing in a path at a constant uniform rate, seizing successive equal numbers of said packages ready for cartoning while advancing at said uniform constant rate and moving said numbers of packages from said edge to edge relation to flat side to side abutment in groups arranged along a plurality of paths, and then combining said abutment groups into a single file delivery path as successive predetermined counts for cartoning.

33. In an apparatus unit of the character described, a counted group selector comprising means for transferring a group of filled flat-sided pillow-shaped packages from a line series edge to edge relation output source into a plurality of paths in equal groups each assembled in face to face abutment relation, means for retaining said packages in an erect face to face abutment relation, pusher heads aligning with passageways and movably mounted stall structures for receiving said equal groups successively therethrough, and assembly means including a pusher head aligning with a delivery chute having a slide gate movably mounted therealong for receiving said equal groups passing from said stall structures into a single path to automatically deposit said groups in successive segregated predetermined count deliveries for said cartoning.

34. In an apparatus unit of the character described, the combination of means for manufacturing filled flat-sided pillow-shaped packages in an uninterrupted continuously advancing edge to edge series output including a measuring device for delivering in proper timed relation measured quantities of fluent material as a filling for each of said packages, means for applying string-handles and tags to each package in said uninterrupted continuously advancing series output, an automatic inspection control in the path of movement of said filled packages supervising and detecting defective packages of the filling operation, a counted group selector including means for transferring a group of said filled flat-sided packages from said edge to edge relation into a plurality of paths in equal groups assembled in face to face abutment relation and means for assembling said groups in a single path in successive segregated predetermined package count deliveries for cartoning, and power means for operating said manufacturing means, measuring device, string-handle and tag applying means, inspection control and selector in timed relation.

35. In an apparatus of the character described, means for manufacturing filled packages in an uninterrupted continuous advancing edge to edge series output, each package being formed as a completely finished unit with a string-handle looped in non-tangling position terminating in a tag freely suspended against one face of the package, a counted group selector for delivering said manufacturing output in predetermined numbers of said completely finished filled packages including means for seizing a group of said finished packages during said uninterrupted advancement while retaining said tag and string-handle loop in said non-tangling position, and power drive means for operating said selector in timed relation with said manufacturing means.

36. In a method of manufacturing filled pillow shaped packages of the character described, each package provided with a closure seam having a string-handle and tag anchored thereto, the steps of keeping the packages continuously advancing in series abutment relation while shortening each of the string-handles to a non-tangling looped position, said shortening steps including through-piercing each package, extending a mid-portion of each string-handle therethrough and positioning a loop portion of the string on one side of the package and the tag against the opposite package side.

References Cited in the file of this patent

UNITED STATES PATENTS

| | | |
|---|---|---|
| 1,791,153 | Aldrich et al. | Feb. 3, 1931 |
| 2,053,418 | Braren | Sept. 8, 1936 |
| 2,133,189 | Dalton | Oct. 11, 1938 |
| 2,291,645 | Nordquist | Aug. 4, 1942 |
| 2,334,256 | Eaton | Nov. 16, 1943 |
| 2,360,510 | Murray | Oct. 17, 1944 |
| 2,367,684 | Malhoit | Jan. 23, 1945 |
| 2,457,216 | Eaton et al. | Dec. 28, 1948 |
| 2,490,057 | Irmscher | Dec. 6, 1949 |